(12) United States Patent
Cozzo et al.

(10) Patent No.: US 11,871,409 B2
(45) Date of Patent: Jan. 9, 2024

(54) METHOD AND APPARATUS FOR COVERAGE ENHANCEMENT OF MSG3

(71) Applicant: Samsung Electronics Co., Ltd., Suwon-si (KR)

(72) Inventors: Carmela Cozzo, San Diego, CA (US); Aristides Papasakellariou, Houston, TX (US); Ebrahim MolavianJazi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/938,652

(22) Filed: Oct. 6, 2022

(65) Prior Publication Data

US 2023/0053082 A1 Feb. 16, 2023

Related U.S. Application Data

(63) Continuation of application No. 17/302,492, filed on May 4, 2021, now abandoned.
(Continued)

(51) Int. Cl.
*H04W 72/1268* (2023.01)
*H04W 72/0446* (2023.01)
(Continued)

(52) U.S. Cl.
CPC ... *H04W 72/1268* (2013.01); *H04W 72/0446* (2013.01); *H04W 72/0453* (2013.01);
(Continued)

(58) Field of Classification Search
CPC .......... H04W 72/1268; H04W 72/535; H04W 72/23; H04W 72/0446; H04W 72/0453; H04W 74/0833
See application file for complete search history.

(56) References Cited

U.S. PATENT DOCUMENTS 10,278,207 B2 * 4/2019 Lee ........................ H04L 1/0025
11,019,623 B2 * 5/2021 Lee ........................ H04W 72/23
(Continued)

FOREIGN PATENT DOCUMENTS

EP          3799505 A1 * 3/2021
KR    10-2020-0026706 4      3/2020
(Continued)

OTHER PUBLICATIONS

"3rd Generation Partnership Project; Technical Specification Group Radio Access Network; NR; Physical channels and modulation (Release 16)", 3GPP TS 38.211 V16.0.0, Dec. 2019, 129 pages.
(Continued)

*Primary Examiner* — Jael M Ulysse

(57) ABSTRACT

Methods and apparatuses for coverage enhancement of Msg3. A method for operating a user equipment includes receiving a system information block (SIB) that provides information mapping physical random access channel (PRACH) resources to enable or disable repetitions for a physical uplink shared channel (PUSCH) transmission in a random access procedure and a first time domain resource allocation (TDRA) table. An entry of the first TDRA table indicates a number of repetitions of a PUSCH transmission. The method further includes determining a PRACH resource for transmission of a PRACH, determining, based on the PRACH resource, a TDRA table from between the first TDRA table or a predetermined second TDRA table. No entry of the second TDRA table indicates a number of repetitions for a PUSCH transmission. The method further includes receiving a first grant scheduling transmission of a first PUSCH and transmitting the first PUSCH.

17 Claims, 15 Drawing Sheets

Related U.S. Application Data

(60) Provisional application No. 63/112,020, filed on Nov. 10, 2020, provisional application No. 63/064,762, filed on Aug. 12, 2020, provisional application No. 63/046,907, filed on Jul. 1, 2020, provisional application No. 63/025,665, filed on May 15, 2020.

(51) Int. Cl.
  *H04W 74/08* (2009.01)
  *H04W 72/0453* (2023.01)
  *H04W 72/23* (2023.01)
  *H04W 72/50* (2023.01)

(52) U.S. Cl.
  CPC ......... *H04W 72/23* (2023.01); *H04W 72/535* (2023.01); *H04W 74/0833* (2013.01)

(56) References Cited

U.S. PATENT DOCUMENTS

| | | | |
|---|---|---|---|
| 11,395,182 B2 | 7/2022 | Liu | |
| 2016/0100422 A1* | 4/2016 | Papasakellariou | H04L 1/1822 370/329 |
| 2017/0273113 A1* | 9/2017 | Tirronen | H04W 4/70 |
| 2017/0311319 A1 | 10/2017 | Lee et al. | |
| 2017/0311344 A1* | 10/2017 | Lee | H04W 74/0833 |
| 2018/0279327 A1* | 9/2018 | Ying | H04W 72/0446 |
| 2018/0324641 A1* | 11/2018 | Tsai | H04W 72/04 |
| 2018/0368117 A1* | 12/2018 | Ying | H04L 1/0061 |
| 2019/0149365 A1 | 5/2019 | Chatterjee | |
| 2019/0215872 A1* | 7/2019 | Park | H04W 52/0216 |
| 2019/0261407 A1 | 8/2019 | Irukulapati et al. | |
| 2019/0342921 A1* | 11/2019 | Loehr | H04L 5/0053 |
| 2019/0394759 A1 | 12/2019 | Ying | |
| 2020/0059390 A1* | 2/2020 | Zhang | H04L 1/1896 |
| 2020/0107277 A1* | 4/2020 | Jeon | H04W 52/228 |
| 2020/0120709 A1* | 4/2020 | Bergquist | H04W 76/11 |
| 2020/0146032 A1 | 5/2020 | Bae | |
| 2020/0267756 A1 | 8/2020 | Fakoorian | |
| 2020/0314820 A1 | 10/2020 | Kim et al. | |
| 2020/0383134 A1* | 12/2020 | Tirronen | H04B 7/0626 |
| 2020/0396744 A1* | 12/2020 | Xiong | H04L 5/0051 |
| 2021/0007149 A1* | 1/2021 | Li | H04L 27/0006 |
| 2021/0051669 A1 | 2/2021 | Lin | |
| 2021/0051707 A1 | 2/2021 | Rastegardoost | |
| 2021/0058823 A1 | 2/2021 | Liu et al. | |
| 2021/0058947 A1 | 2/2021 | Lin | |
| 2021/0076384 A1* | 3/2021 | MolavianJazi | H04B 17/318 |
| 2021/0136830 A1* | 5/2021 | Lin | H04W 72/23 |
| 2021/0195653 A1 | 6/2021 | Lei | |
| 2021/0219322 A1* | 7/2021 | Chin | H04L 1/1896 |
| 2021/0251016 A1 | 8/2021 | Xiong | |
| 2021/0274556 A1* | 9/2021 | Park | H04W 24/10 |
| 2021/0307082 A1 | 9/2021 | Wang | |
| 2021/0329703 A1* | 10/2021 | Yang | H04L 5/001 |
| 2021/0377979 A1 | 12/2021 | Bhamri | |
| 2022/0015150 A1* | 1/2022 | Ye | H04W 74/0833 |
| 2022/0029659 A1* | 1/2022 | Liu | H04B 1/7143 |
| 2022/0086765 A1* | 3/2022 | Zhang | H04W 52/50 |
| 2022/0086896 A1 | 3/2022 | Takahashi | |
| 2022/0103294 A1 | 3/2022 | Ying | |
| 2022/0104187 A1* | 3/2022 | Zhou | H04L 1/1822 |
| 2022/0201722 A1 | 6/2022 | Takeda | |
| 2022/0210824 A1 | 6/2022 | Ying | |
| 2022/0231789 A1 | 7/2022 | Ying | |

FOREIGN PATENT DOCUMENTS

| | | | | |
|---|---|---|---|---|
| KR | 10-2020-0042946 A | 4/2020 | | |
| WO | WO-2018175596 A1 * | 9/2018 | ......... | H04L 5/0005 |
| WO | 2019141061 A1 | 7/2019 | | |
| WO | 2019-170390 A1 | 9/2019 | | |
| WO | WO-2019224876 A1 * | 11/2019 | | |

OTHER PUBLICATIONS

"3rd Generation Partnership Project; Technical Specification Group Radio Access Network; NR; Multiplexing and channel coding (Release 16)", 3GPP TS 38.212 V16.0.0, Dec. 2019, 145 pages.
"3rd Generation Partnership Project; Technical Specification Group Radio Access Network; NR; Physical layer procedures for control (Release 16)", 3GPP TS 38.213 V16.0.0, Dec. 2019, 146 pages.
"3rd Generation Partnership Project; Technical Specification Group Radio Access Network; NR; Physical layer procedures for data (Release 16)", 3GPP TS 38.214 V16.0.0, Dec. 2019, 147 pages.
"5G; NR; Medium Access Control (MAC) protocol specification (3GPP TS 38.321 version 15.8.0 Release 15)", ETSI TS 138 321 V15.8.0, Jan. 2020, 80 pages.
"5G; NR; Radio Resource Control (RRC); Protocol specification (3GPP TS 38.331 version 15.8.0 Release 15)", ETSI TS 138 331 V15.8.0, Jan. 2020, 527 pages.
International Search Report and Written Opinion of the International searching Authority dated Aug. 31, 2021, in connection with International Patent Application No. PCT/KR2021/006109, 7 pages.
CATT, "Remaining issues on PUSCH enhancements", 3GPP TSG RAN WG1 #100, R1-2000529, e-Meeting, Feb. 24-Mar. 6, 2020, 12 pages.
Moderator (Apple Inc.), "Summary of Email discussion [100b-e-NR-L1enh-URLLC-PUSCH-04] on PUSCH enhancements for NR eURLLC (AI 7.2.5.3)", 3GPP TSG-RAN WG1 Meeting #100bis-e, R1-2003006, e-Meeting, Apr. 20-Apr. 30, 2020, 39 pages.
Extended European Search Report dated Oct. 25, 2023 regarding Application No. 21805327.0, 9 pages.
Fujitsu, "PUSCH enhancements for URLLC", 3GPP TSG RAN WG1 Meeting #97, R1-1906584, May 2019, 4 pages.

* cited by examiner

METHOD AND APPARATUS FOR COVERAGE ENHANCEMENT OF MSG3

CROSS-REFERENCE TO RELATED APPLICATION AND CLAIM OF PRIORITY

This application is a continuation of U.S. patent application Ser. No. 17/302,492, filed on May 4, 2021, which claims priority under 35 U.S.C. § 119(e) to U.S. Provisional Patent Application No. 63/025,665 filed on May 15, 2020, U.S. Provisional Patent Application No. 63/046,907 filed on Jul. 1, 2020, U.S. Provisional Patent Application No. 63/064,762 filed on Aug. 12, 2020, and U.S. Provisional Patent Application No. 63/112,020 filed on Nov. 10, 2020. The above-identified provisional patent applications are hereby incorporated by reference in their entirety.

TECHNICAL FIELD

The present disclosure relates generally to wireless communication systems and, more specifically, the present disclosure relates to coverage enhancement of Msg3.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to coverage enhancement of Msg3.

In one embodiment, a user equipment (UE) is provided. The UE includes a transceiver configured to receive a system information block (SIB) that provides information mapping physical random access channel (PRACH) resources to enable or disable repetitions for a physical uplink shared channel (PUSCH) transmission in a random access procedure and a first time domain resource allocation (TDRA) table. An entry of the first TDRA table indicates a number of repetitions of a PUSCH transmission. The UE further includes a processor operably connected to a transceiver. The processor is configured to determine a PRACH resource for transmission of a PRACH and determine, based on the PRACH resource, a TDRA table from between first TDRA table or a predetermined second TDRA table. No entry of the second TDRA table indicates a number of repetitions for a PUSCH transmission. The transceiver is further configured to receive a first grant scheduling transmission of a first PUSCH, where the first grant indicates an entry of the TDRA table, and transmit the first PUSCH.

In another embodiment, a base station (BS) is provided. The BS includes a transceiver configured to transmit a SIB that provides information mapping PRACH resources to enable or disable repetitions for a PUSCH transmission in a random access procedure and a first TDRA table. An entry of the first TDRA table indicates a number of repetitions of a PUSCH transmission. The BS further includes a processor operably connected to a transceiver. The processor is configured to determine a PRACH resource for reception of a PRACH and determine, based on the PRACH resource, a TDRA table from between the first TDRA table or a predetermined second TDRA table. No entry of the second TDRA table indicates a number of repetitions for a PUSCH transmission. The transceiver is further configured to transmit a first grant scheduling transmission of a first PUSCH, where the first grant indicates an entry of the TDRA table, and receive the first PUSCH.

In yet another embodiment, a method is provided. The method includes receiving a SIB that provides information mapping PRACH resources to enable or disable repetitions for a PUSCH transmission in a random access procedure and a first TDRA table. An entry of the first TDRA table indicates a number of repetitions of a PUSCH transmission. The method further includes determining a PRACH resource for transmission of a PRACH, determining, based on the PRACH resource, a TDRA table from between the first TDRA table or a predetermined second TDRA table. No entry of the second TDRA table indicates a number of repetitions for a PUSCH transmission. The method further includes receiving a first grant scheduling transmission of a first PUSCH, where the first grant indicates an entry of the TDRA table, and transmitting the first PUSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.0.0, "NR; Physical channels and modulation," 3GPP TS 38.212 v16.0.0, "NR; Multiplexing and channel coding," 3GPP TS 38.213 v16.0.0, "NR; Physical layer procedures for control," 3GPP TS 38.214 v16.0.0, "NR; Physical layer procedures for data," 3GPP TS 38.321 v15.8.0, "NR; Medium Access Control (MAC) Protocol Specification," and 3GPP TS 38.331 v15.8.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
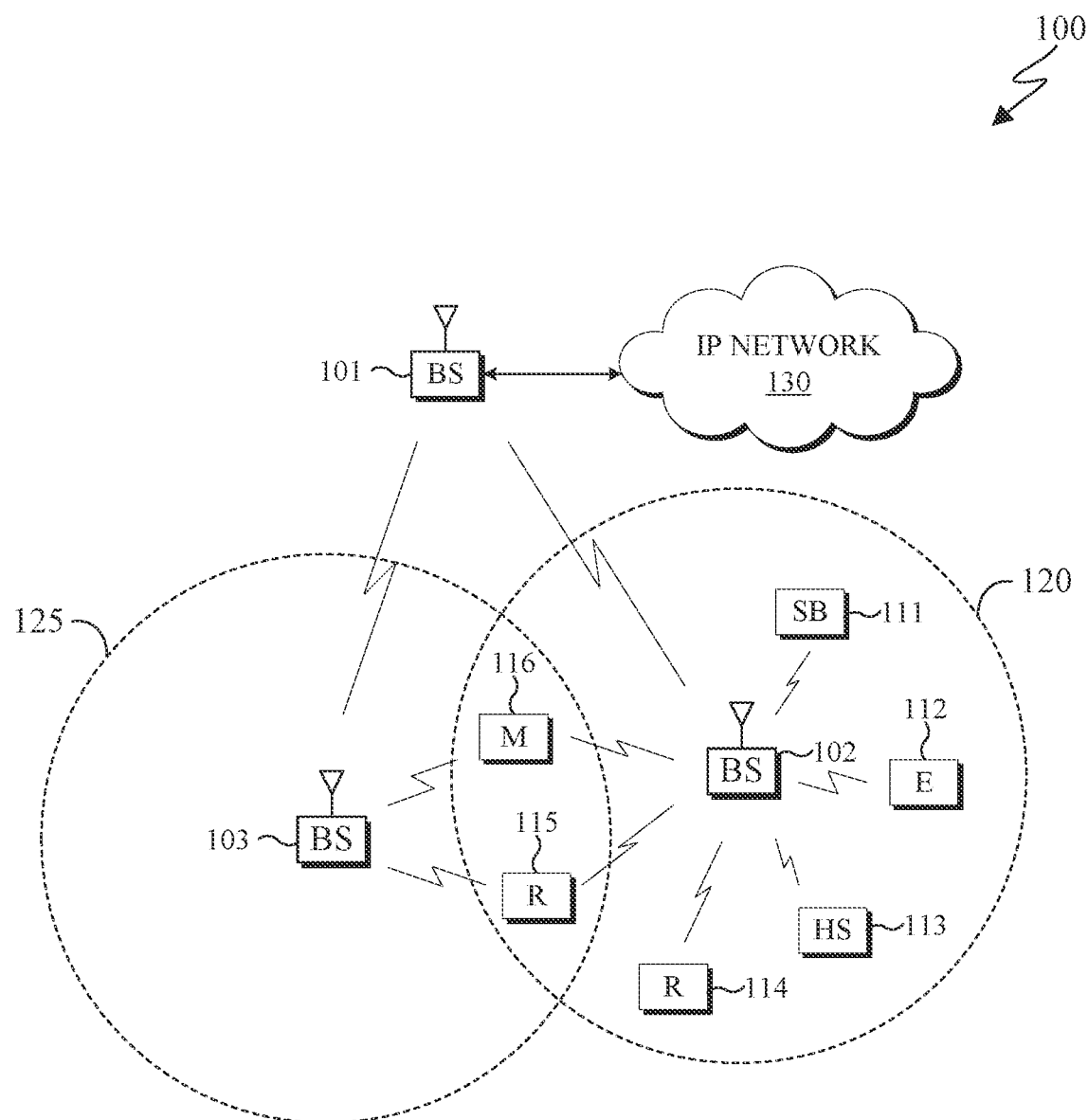
FIG. 1 illustrates an example wireless network according to embodiments of the present disclosure.
Figure 2:
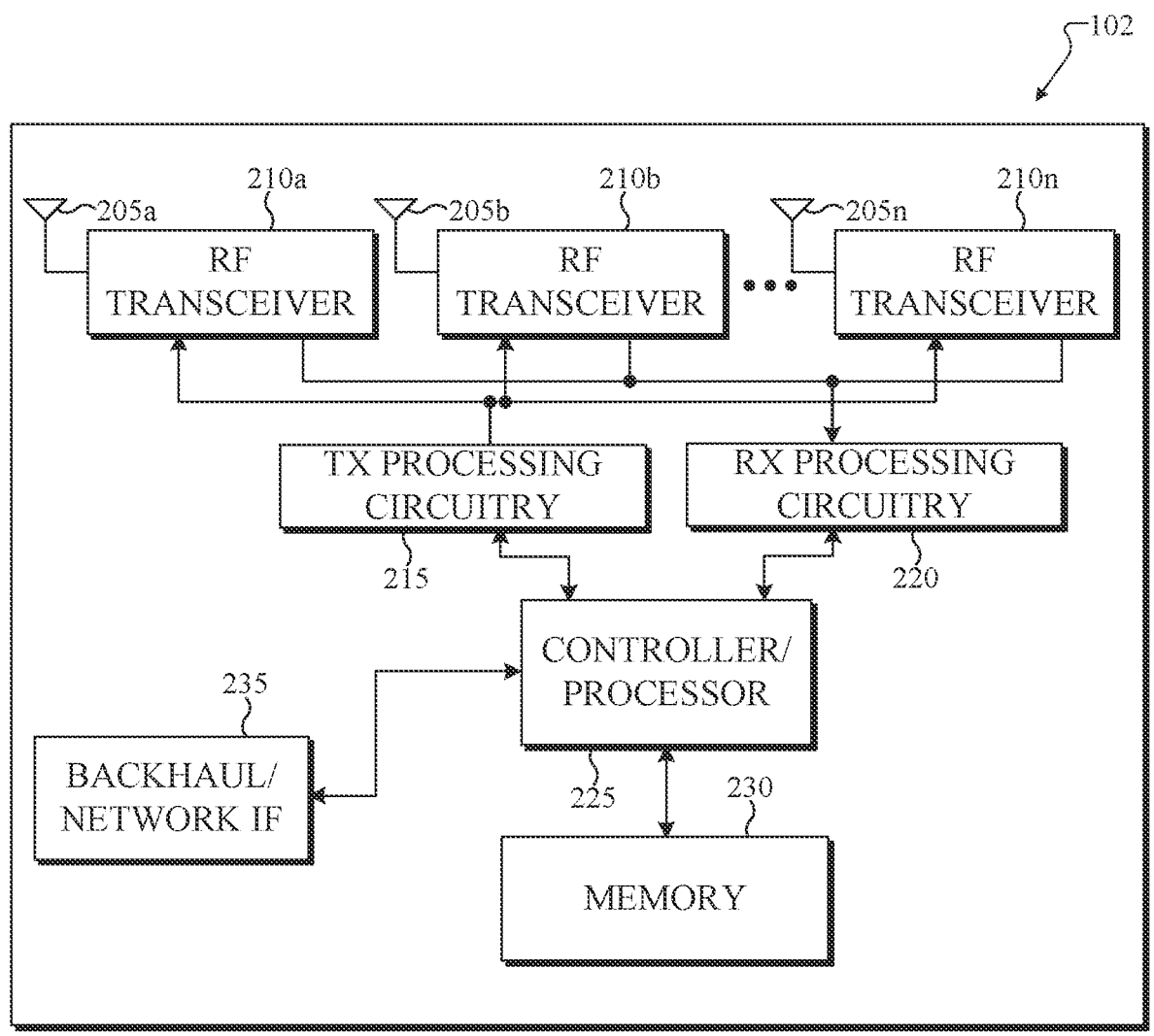
FIG. 2 illustrates an example gNB according to embodiments of the present disclosure.
Figure 3:
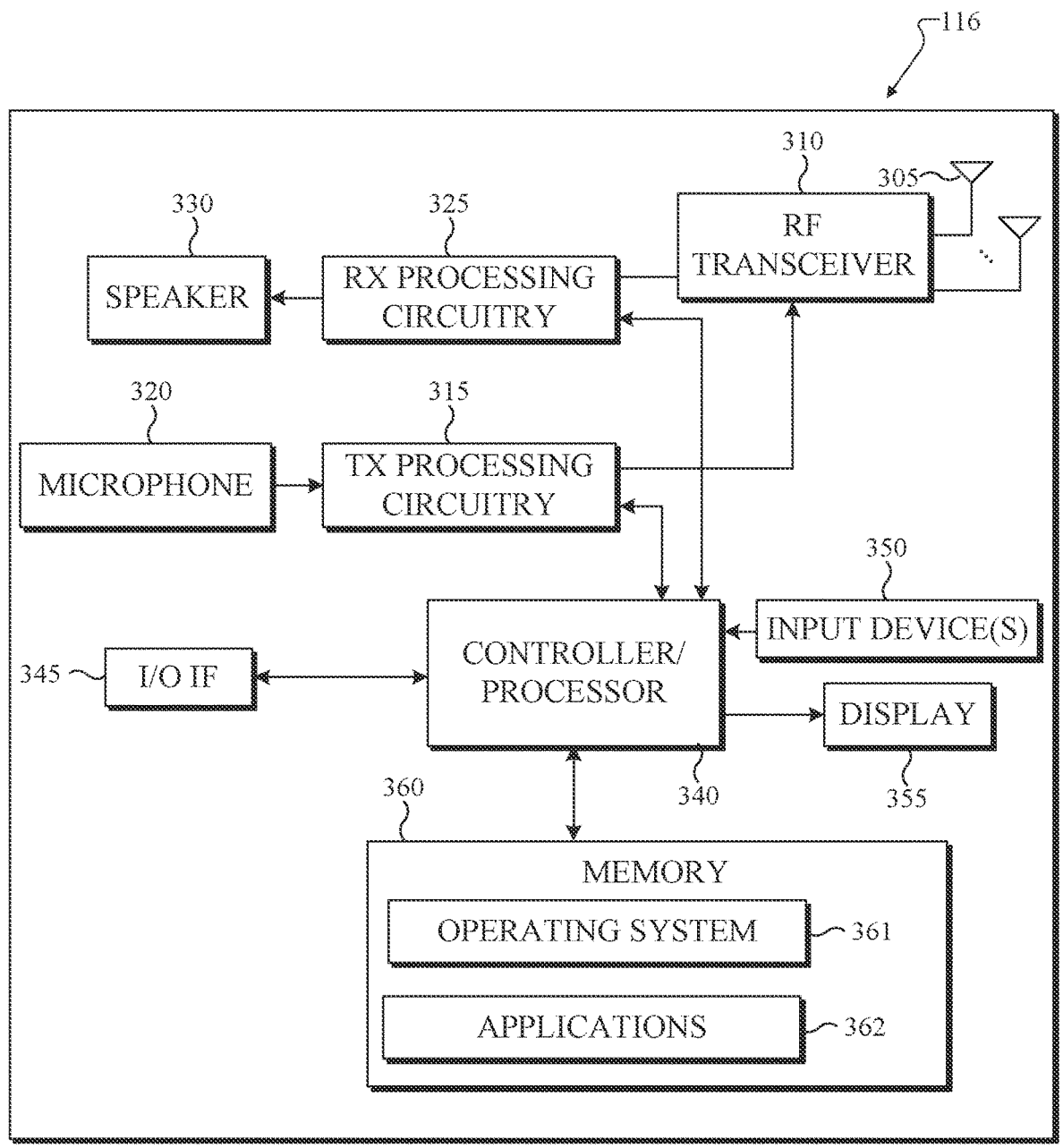
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network includes a gNB 101 (e.g., base station, BS), a BS 102, and a gNB 103. The gNB 101 communicates with the BS 102 and the gNB 103. The gNB 101 also communicates with at least one network 130, such as the Internet, a proprietary Internet Protocol (IP) network, or other data network.

The BS 102 provides wireless broadband access to the network 130 for a first plurality of UEs within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine). For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for receiving and/or transmitting Msg3. In certain embodiments, and one or more of the gNB s 101-103 includes circuitry, programing, or a combination thereof for receiving and/or transmitting Msg3.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each BS 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support for receiving and/or transmitting Msg3. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other gNBs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a gNB of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
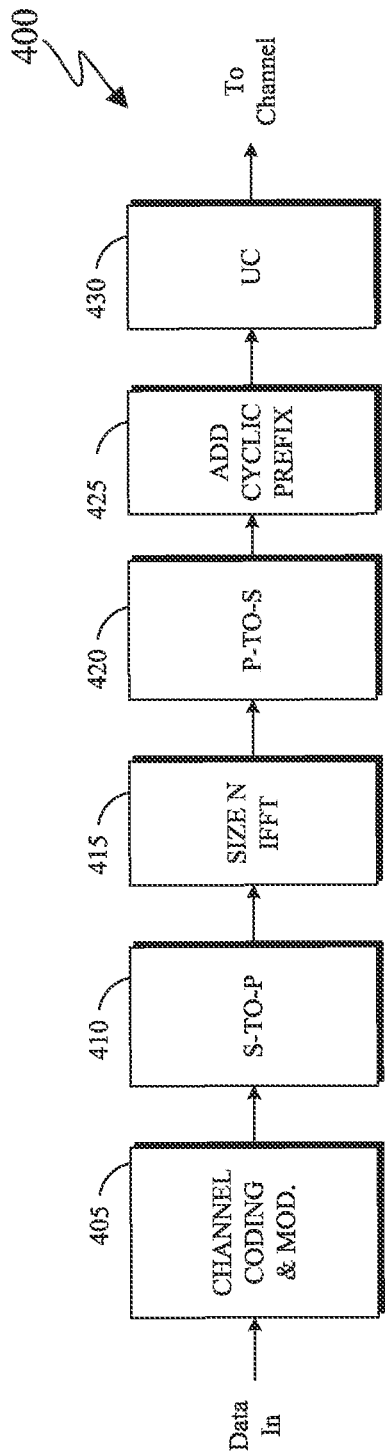
FIGS. 4 and 5 illustrate example wireless transmit and receive paths according to embodiments of the present disclosure.
Figure 5:
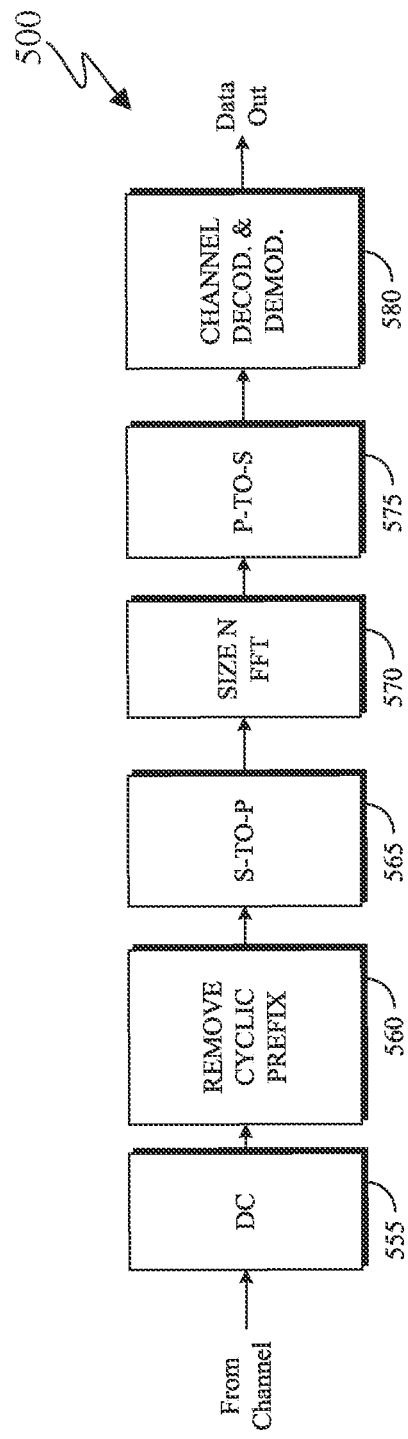

FIG. 4 and FIG. 5 illustrate example wireless transmit and receive paths according to this disclosure. In the following description, a transmit path 400, of FIG. 4, may be described as being implemented in a gNB (such as the BS 102), while a receive path 500, of FIG. 5, may be described as being implemented in a UE (such as a UE 116). However, it may be understood that the receive path 500 can be implemented in a gNB and that the transmit path 400 can be implemented in a UE. In some embodiments, the receive path 500 is configured to support Msg3 as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The S-to-P block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The P-to-S block 420 converts (such as multiplexes) the parallel time-domain output symbols from the size N IFFT block 415 in order to generate a serial time-domain signal. The add cyclic prefix block 425 inserts a cyclic prefix to the time-domain signal. The UC 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The S-to-P block 565 converts the time-domain baseband signal to parallel time domain signals. The size N FFT block 570 performs an FFT algorithm to generate N parallel frequency-domain signals. The P-to-S block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure relate to transmitting Msg3 physical uplink shared channel (PUSCH) with repetitions. Embodiments of the present disclosure also relate to determining the number of repetitions for Msg3 PUSCH transmission for a UE operating in a CE mode or in a normal coverage mode. Embodiments of the present disclosure further relate to determining a redundancy version for each repetition of a Msg3 PUSCH transmission. Additionally, embodiments of the present disclosure relate to determining a time domain resource allocation for a Msg3 PUSCH transmission. Yet further embodiments of the present disclosure relate to determining a number of PUSCH repetitions defined by a number of symbols. Embodiments of the present disclosure also relate to a UE determining a timing for reception of a Msg4 physical downlink shared channels (PDSCH).

The variety of applications for 5G and beyond requires different target values for different capabilities for networks and UEs (such as the UE 116 of FIG. 1) such as peak data rate, capacity, latency, mobility, connection density, network energy efficiency, and so on. The main usage scenarios can be categorized as enhanced Mobile Broadband (eMBB), Ultra-Reliable Low Latency Communications (URLLC), and massive Machine Type Communications (mMTC).

The eMBB scenario can be characterized by high data rates, high user density and wide-area coverage. The URLLC scenario can be characterized by low latency, high reliability and high availability. The mMTC scenario can be characterized by high connection density, low power consumption and low complexity.

To satisfy the various applications and use cases, embodiments of the present disclosure take into consideration that UEs targeted for different applications or use cases can have different characteristics and correspond to different UE types. For example, UEs belonging to the broad category of mMTC have requirements on latency/data rate/battery life/connection density in order to support specific IoT (Internet of Things) use cases in vertical industries. One type of UEs may have reduced capabilities respect to UEs for eMBB use cases. Such UEs with certain characteristics in terms of bandwidth, number of Rx and/or Tx RF chains, power class, can support the required latency, data rate, battery life, density of UEs for a certain use cases or applications, and operate in a same network with other types of UEs, such as ones for eMBB and/or URLLC services. Examples of use cases include industrial wireless sensors (IWS), video surveillance, and wearables.

Given the diverse requirements associated with the diverse use cases, a UE type indicates certain characteristics/capabilities/features that can fulfill the requirements of one or more use cases. Such characteristics include, but are not limited to, cost, complexity, capabilities such as bandwidth, number of Rx and/or Tx RF chain, power class, coverage class, and the like.

In this disclosure the terminology of 'normal UE' and 'redcap UE' are intended in a broad sense to indicate UE types with certain capabilities or configured with certain capabilities. The term 'normal UE' may indicate R15/R16 UEs intended for eMBB applications. The term 'redcap UE' may indicate UEs that have reduced capabilities and/or are configured to use reduced capabilities compared to normal UEs. The reduced capabilities are related but are not restricted to bandwidth, number of Rx and/or Tx RF chains, power classes, and the like.

For applications with less stringent requirements on latency and data rate, one way to improve coverage is by extending the transmission time: the physical signal or channel can be transmitted a number of times and, depending on the number of repetitions or retransmissions, the coverage can be enhanced to a certain range. For UEs with reduced capabilities the introduction of such type of coverage improvements compensates for the reduced coverage due to, for example in downlink (DL), the reduced number of UE receiver antennas or, in uplink (UL), due to a lower maximum UE transmit power. For all types of UEs, in case a UE is in extreme coverage limiting situation, such mechanisms improve coverage while maintaining an efficient network operation.

For a LTE MTC scenario, two modes are introduced to enhance coverage. A first mode, denoted as coverage enhancement (CE) Mode A, supports up to 32 subframe repetitions for a transmission of a PDSCH or of a PUSCH for a transport block (TB). CE Mode A is optimized for small or moderate CE that can be achieved through a relatively small number of repetitions. A second mode, denoted as CE Mode B, supports up to 2048 subframe repetitions for a PDSCH or PUSCH transmission with a same TB. If a UE supports CE mode B, the UE also supports CE mode A. For a PRACH transmission, the CE operation is categorized into four levels where each level represents a different process for PRACH and paging. For each CE Mode, there are two levels corresponding to different numbers of repetitions n, m or p, with n<m<p. In CE Mode A: Level 0 (no repetition for PRACH) and Level 1 (n repetitions). In CE Mode B: Level 2 (m repetitions) and Level 3 (p repetitions). In the UE configuration, a radio resource control Information Element (IE) provides a configuration for a list of PRACH transmission parameters for each coverage level. The first entry in the list contains PRACH information of CE level 0, the second entry in the list contains PRACH information of CE level 1, and so on. The eNB determines the CE Mode, and the level within each Mode is determined by the UE. Up to three reference signal received power (RSRP) threshold values are signalled in a system information block (SIB) by the gNB for a UE to determine a CE level for a PRACH transmission. The number of configured RSRP thresholds is equal to the number of configured CE levels minus one. For a UE that supports a different (smaller) power class than 23 dBm, a corresponding adjustment (reduction) needs to be done by the UE to the RSRP threshold values signalled by eNB.

A random access (RA) procedure can be initiated to fulfill several purposes including for example one of the following ones: establish RRC connection (to go from RRC_IDLE to RRC_CONNECTED), re-establish RRC connection after radio link failure (RLF), on-demand system information (SI) request, UL synchronization, scheduling request (SR), positioning, link recovery—also known as beam failure recovery (BFR). A physical random access procedure can be is triggered upon request of a PRACH transmission by higher layers at a UE or by a physical downlink control channel (PDCCH) order from a serving gNB. It is noted that, RA can operate in two modes. The first RA operation mode is denoted as contention-based random access (CBRA). In CBRA UEs within a serving cell can share same RA resources and there is therefore a possibility of collision among RA attempts from different UEs. The second RA operation mode is denoted as contention-free random access (CFRA). In CFRA a UE has dedicated RA resources that can be, for example, indicated by a serving gNB and may not be shared with other UEs so that RA collisions can be avoided.

A random access procedure, also known as a Type-1 L1 random access procedure includes 4-step. In step-1 a UE transmits a Physical Random Access Channel (PRACH) preamble (Msg1). In step-2 a gNB transmits of Random Access Response (RAR) message with a PDCCH/PDSCH (Msg2). In step-3 the UE transmits a contention resolution message and when applicable, the transmission of a PUSCH scheduled by a RAR UL grant (Msg3). In step-4 the gNB transmits a contention resolution message (Msg4).

According to embodiments of the present disclosure, instead of a 4-step RA procedure (described above), a 2-step RA procedure can be used where a UE can transmit both a PRACH preamble and a PUSCH (MsgA) prior to reception of a corresponding RAR (MsgB).

In certain embodiments, a UE, configured for operation in bandwidth parts (BWPs) of a serving cell, is configured by higher layers a set of (for example at most four) BWPs in a DL bandwidth for receptions by the UE (DL BWP set). The UE is also configured, by a set of (for example at most four) BWPs in an UL bandwidth for transmissions by the UE (UL BWP set). At a given time, one of the configured BWPs is considered as the active BWP where the UE receives (active DL BWP) or transmits (active UL BWP). The downlink carrier can be associated with two uplink carriers where a first uplink carrier is typically referred to as (primary) uplink carrier and a second uplink carrier is typically referred to as supplementary uplink (SUL) carrier. One UL carrier, the non-SUL carrier or primary carrier, is located in a frequency division duplexing (FDD) or time division duplexing (TDD) band as the associated/linked DL carrier, and the SUL carrier is typically located in a lower frequency band. The decoupling of uplink and downlink frequency bands enhances cell coverage, and the lower frequency carrier allows UEs at the cell-edge or in general UEs experiencing a large path loss to access the network with the lower uplink carrier and improves coverage compared to using the uplink carrier at the higher frequency band.

In certain embodiments, a UE that is capable of coverage enhancement support can access a cell in a coverage enhancement mode and can be configured in a coverage enhancement mode. Such UE is referred to as 'CE UE' or 'UE in enhanced coverage.' The CE UE can be a UE with a first set of capabilities, such as for a number of receiver antennas or for operation over a first maximum bandwidth, or a UE with second, reduced, set of capabilities (RedCap UE) such as a smaller number of receiver antennas or for operation over a second maximum bandwidth that are both smaller that the respective first numbers.

In certain embodiments, a gNB can configure a UE to operate in one CE mode from a set of CE modes (e.g., CE-Mode1, CE-Mode2, . . . ) where each mode can be optimized to improve coverage in respective coverage conditions. The CE mode can be defined by a specific method to enhance coverage. For example, the CE mode can be defined by a number of repetitions used for the transmission of physical channels and signals. In addition to transmission with repetitions, a CE mode of operation can be associated with specific configurations for transmission of physical channels and formats. For example, a serving gNB can configure a first UE with CE-Mode1 when the first UE requires a small coverage enhancement such as one corresponding to a signal to interference and noise ratio (SINR) gain 6 dB. A gNB can configure a second UE with CE-Mode2 or other modes in case a large coverage enhancement is needed for the second UE.

A single CE mode can also be defined and in that case the UE can either be configured in normal coverage or in a CE mode. A UE can further adapt uplink transmission to the coverage conditions by determining a corresponding CE level. A CE level can be associated with a number of repetitions of an uplink channel or signal.

Embodiments of the present disclosure provide for determination of the number of repetitions for Msg3 for a UE in CE mode. The following examples and embodiments describe determining the number of repetitions for Msg3 for a UE in CE mode. In certain embodiments, a gNB (such as the BS 102) can configure a UE to operate in a CE mode. For a Msg3 PUSCH transmission, a CE mode is associated with one or more CE levels. For a total of L CE levels and N CE modes, with L>=N, a UE can be configured with a CE mode and a CE level for the CE mode. In certain embodiments, a UE can be configured to operate either without CE (normal mode) or in a CE mode. For example, if a UE is configured in a CE mode, a serving gNB can configure the UE with one or more RSRP thresholds (RSRP thresholds for CE level identification). The UE can then determine the CE level based on RSRP measurements and thresholds. In certain embodiments, each CE level can be associated with a configuration for a PRACH transmission. Each CE level can also be associated with one or more parameters for the Msg3 PUSCH transmission such as a number of repetitions.

For a UE configured to operate in a CE mode, a number of repetitions for a Msg3 PUSCH transmission with a TB can be configured by higher layers. A field in the RRC IE RACH-ConfigCommon which is used to specify the cell specific random-access parameters can indicate the number of Msg3 repetitions for each CE level. Alternatively, a field in the RRC IE pusch-ConfigCommon which is used to configure the cell specific PUSCH parameters can be used. The UE can determine the number of repetitions for a Msg3 PUSCH transmission with a TB from a configured value of repetitions for the CE level in which the UE operates such as for the PRACH transmission. A number of repetitions for a Msg3 PUSCH transmission can be indicated by a field in the UL grant provided by the RAR message scheduling the Msg3 PUSCH transmission. For example, the field can include two bits and indicate one of four repetition numbers where the four repetition numbers are provided by higher layers. The four repetition numbers can be separately provided for each CE level associated with the corresponding PRACH transmission. It is also possible for a serving gNB to indicate a number of repetitions for a Msg3 PUSCH transmission by field in the downlink control information (DCI) format scheduling the PDSCH reception that provides the RAR message associated with the Msg3 PUSCH transmission.

In certain embodiments if the number of repetitions for a Msg3 transmission is indicated by higher layers and is also signaled either by a field in the DCI format scheduling the RAR PDSCH reception or in the UL grant of the RAR message in the PDSCH reception, a UE that is configured for operation with CE uses the value that the UE determined based on the indication by the field.

It is noted that a field carrying the number of Msg3 PUSCH repetitions cannot be present both in the DCI format scheduling the RAR PDSCH reception and in the UL grant of the RAR message in the PDSCH reception. For example, a UE is not expected to be indicated the number of repetitions for Msg3 PUSCH transmission in the DCI format scheduling the RAR PDSCH reception and in the UL grant of the RAR message in the PDSCH reception. Similarly, a UE is not expected to receive the indication for a number of repetitions for Msg3 PUSCH transmission in the UL grant of the RAR message in the PDSCH reception when the UE receives the indication in the DCI format scheduling the RAR PDSCH reception. For instance, if a UE receives the indication of number of repetitions for Msg3 PUSCH transmission in the DCI format scheduling the RAR PDSCH reception, the UE discards the indication of Msg3 PUSCH repetitions in the UL grant of the RAR message in the PDSCH reception if present.

Figure 6:
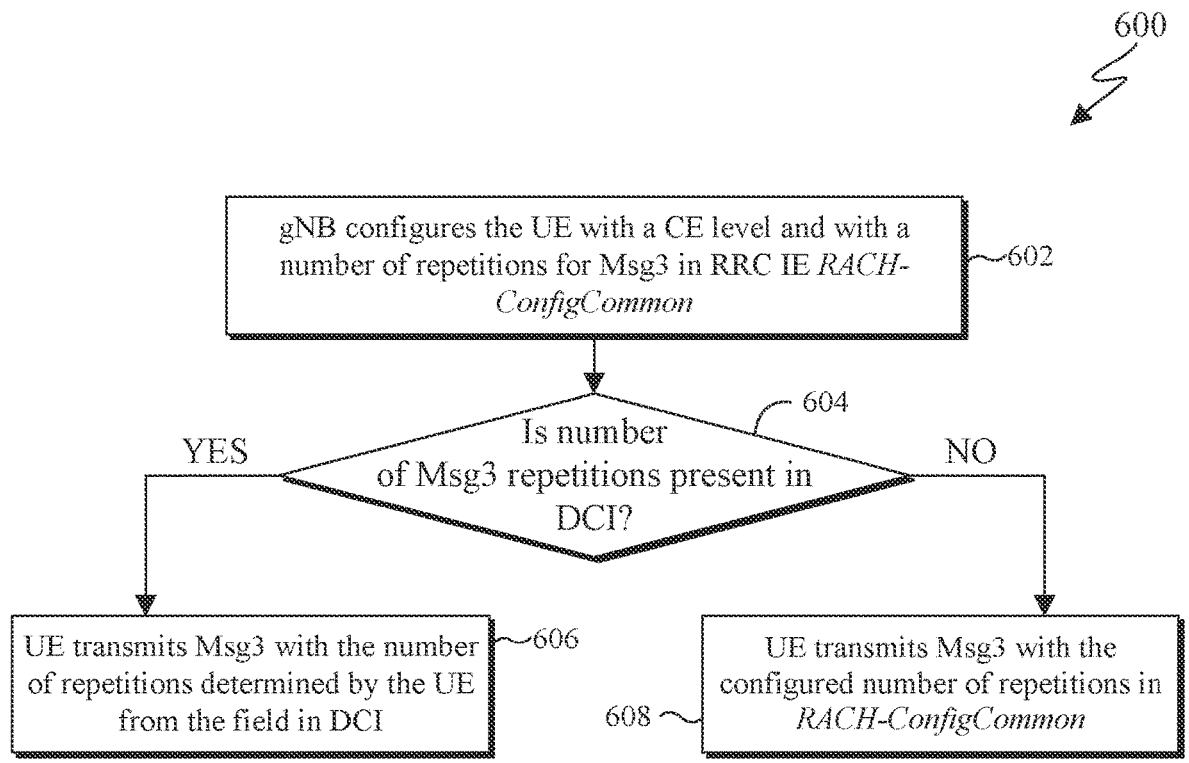
FIGS. 6 and 7 illustrate example methods for determining a number of repetitions for Msg3 PUSCH transmission according to embodiments of the present disclosure.
Figure 7:
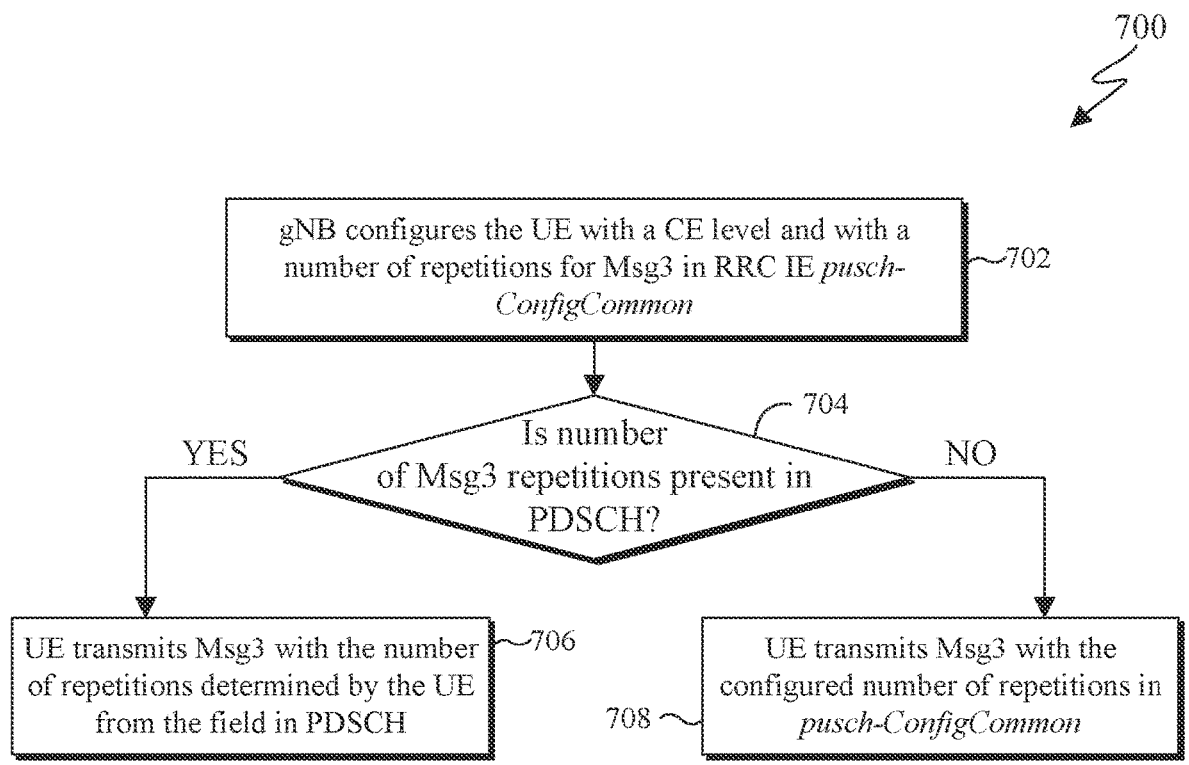

FIGS. 6 and 7 illustrate example methods 600 and 700, respectively, for determining a number of repetitions for Msg3 PUSCH transmission according to embodiments of the present disclosure. For example, the steps of the methods 600 and 700 can be performed by any of the UEs 111-116 of FIG. 1, such as the UE 116 of FIG. 3. The method 600 of FIG. 6 and the method 700 of FIG. 7 are for illustration only and other embodiments can be used without departing from the scope of the present disclosure.

As illustrated in FIG. 6, in step 602, a gNB configures the UE with a CE level and with a number of repetitions for the Msg3 PUSCH transmission by higher layers such as for example in an IE RACH-ConfigCommon 510. For example, a UE (such as the UE 116) is configured by a gNB (such as the BS 102) with a CE level and a number of repetitions for the Msg3 PUSCH transmission.

In step 604, the UE determines whether the number of Msg3 repetitions is present in the DCI. If the number of repetitions is indicated in a field of the DCI format scheduling a PDSCH reception that provides a corresponding RAR message, then in step 606, the UE transmits Msg3 with the number of repetitions that the UE determines from the indication provided by the field. For example, the UE can be provided with four numbers of repetitions for a CE level the UE uses for the PRACH transmission and a field of 2 bits can indicate one of the four numbers. Otherwise, in step 608, the UE transmits Msg3 with the configured number of repetitions in RACH-ConfigCommon.

As illustrated in FIG. 7, the method 700 describes a UE procedure for determining a number of repetitions for a Msg3 PUSCH transmission. In step 702, a gNB configures the UE with a CE level and with a number of repetitions for the Msg3 PUSCH transmission by higher layers such as for example in pusch-ConfigCommon. For example, a UE (such as the UE 116) is configured by a gNB (such as the BS 102) with a CE level and a number of repetitions for the Msg3 in RRC.

In step 704, the UE determines whether the number of Msg3 repetitions is present in the PDSCH. If the number of repetitions is indicated in a field of the UL grant scheduling the Msg3 PUSCH transmission, then the UE in step 706 transmits Msg3 with the number of repetitions that the UE determines from the indication provided by the field. For example, the UE can be provided with four numbers or repetitions for a CE level the UE uses for the PRACH transmission and a field of 2 bits can indicate one of the four numbers. That is, in step 706, the UE can transmit Msg3 with the number of repetitions determined by the UE from the filed in the PDSCH. Otherwise, in step 708, the UE transmits Msg3 with the configured number of repetitions in pusch-ConfigCommon.

Although FIG. 6 illustrates the method 600 and FIG. 7 illustrates the method 700, various changes may be made to FIGS. 6 and 7. For example, while methods 600 and 700 are shown as a series of steps, various steps could overlap, occur in parallel, occur in a different order, or occur multiple times. In another example, steps may be omitted or replaced by other steps. For example, steps of the method 600 can be executed in a different order. For another example, steps of the method 700 can be executed in a different order.

The following embodiments and examples describe a determination of Msg3 repetitions related to the CE level corresponding to the PRACH transmission.

In certain embodiments, for a UE configured for operation with CE, a number of repetitions for a Msg3 PUSCH transmission corresponding to a configured CE level can be configured. For PRACH transmission, the UE can determine the PRACH resource configuration corresponding to a selected CE level l and transmit PRACH. If the PRACH transmission is not successful (such as if a RAR is not received by the UE within the configured time window for RAR reception), then the UE initiates the RA procedure again by (i) transmitting PRACH with the same configuration or (ii) determining the PRACH resource configuration corresponding to a different CE level, for example the next higher CE level l+1, and transmitting such PRACH. In this case the number of repetitions for a Msg3 PUSCH transmission associated to the RAR transmitted by the gNB, if such Msg3 PUSCH transmission exists, can be determined from the number of Msg3 PUSCH repetitions corresponding to the same (in this example, l+1) CE level used by the PRACH transmission.

It is possible that the granularity of the CE levels associated with the PRACH transmission is different than the granularity of the CE levels associated to the repetitions of Msg3 PUSCH transmission. For example, four CE levels can be configured for PRACH transmission, and two levels for Msg3 PUSCH transmission, with CE levels 0 and 1 of PRACH transmission associated to a first number of repetitions for Msg3, and with CE levels 2 and 3 of PRACH transmission associated to a second number of repetitions for Msg3. It is also possible that the number of repetitions for a Msg3 PUSCH transmission is the same for all coverage levels associated to the PRACH transmission.

In certain embodiments the number of Msg3 PUSCH repetitions is derived from the configured number of PRACH repetitions. For example, when a gNB configures the UE with a number of PRACH repetitions, the number of Msg3 repetitions can be assumed to be the same as the configured number of PRACH repetitions or it can be derived from it. The number of Msg3 repetitions can be a scaled value, for example ½ or ¼ or double, of the number of PRACH repetitions, wherein the number of PRACH repetitions can be the number of times a same PRACH preamble or different PRACH preambles is/are transmitted with a spatial setting, or the total number of PRACH preamble transmissions over multiple spatial settings. Also, when a UE determines the number of PRACH repetitions based on RSRP measurements and threshold values indicated by a gNB, the UE can use a same number or a scaled number of repetitions for Msg3 PUSCH transmissions. It is possible that the number of Msg3 PUSCH repetitions is derived from the number of repetitions of PRACH preamble transmissions and the number of PRACH attempts. For example, a number of Msg3 PUSCH repetitions can be increased as the number of PRACH attempts increases.

Figure 8:
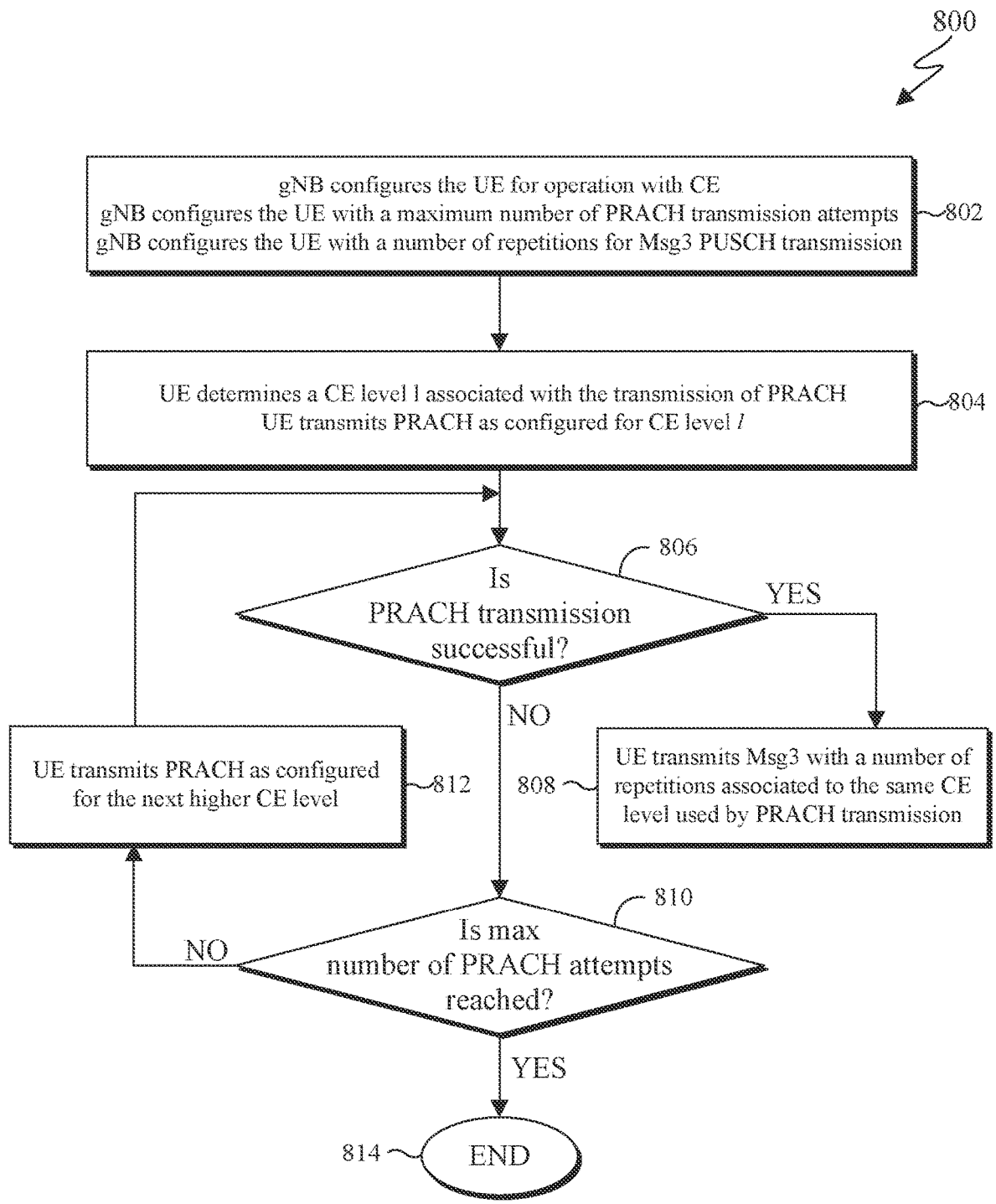
FIG. 8 illustrates an example method for transmitting Msg3 PUSCH with a number of repetitions according to embodiments of the present disclosure.

FIG. 8 illustrates an example method 800 for transmitting Msg3 PUSCH with a number of repetitions according to embodiments of the present disclosure. For example, the steps of the method 800 can be performed by any of the UEs 111-116 of FIG. 1, such as the UE 116 of FIG. 3. The method 800 of FIG. 8 is for illustration only and other embodiments can be used without departing from the scope of the present disclosure.

As illustrated in FIG. 8, the method 800 describes an exemplary procedure for transmitting a Msg3 PUSCH with a number of repetitions associated to the same CE level of the corresponding PRACH transmission. Both PRACH transmission and Msg3 PUSCH transmission are associated to a same number of CE levels, for example 4 levels, with different number of repetitions for PRACH and for Msg3 PUSCH for each CE level.

In step 802, a gNB configures the UE for operation with CE, with a maximum number of PRACH transmission attempts and a number of repetitions for Msg3 PUSCH transmission. In step 804, the UE determines a CE level l for transmitting PRACH, and transmits PRACH as configured for CE level l.

In step 806, the UE determines if the PRACH transmission was successful. If the PRACH transmission is successful and a Msg3 PUSCH transmission exists, then in step 808, the Msg3 PUSCH is transmitted with a number of repetitions associated to CE level l. Alternatively, if the PRACH transmission is not successful, the UE determines whether the number of PRACH attempts is less than the maximum configured value in step 810. That is, if the PRACH transmission is not successful (as determined in step 806) and the number of PRACH attempts is less than the maximum configured value (as determined in step 810), then in step 812, the UE transmits PRACH as configured for the next higher CE level.

The procedure continues repeating the previous steps until either the PRACH transmission is successful (as determined step 806), in which case a Msg3 PUSCH can be transmitted (step 808), or the PRACH transmission is unsuccessful (as determined step 806) and the maximum number of PRACH attempts is reached (as determined in step 810), in which case the RA procedure is terminated in step 814.

Although FIG. 8 illustrates the method 800, various changes may be made to FIG. 8. For example, while method 800 of FIG. 8 is shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure provide for determination of the number of repetitions for Msg3 PUSCH for a UE not in CE mode. The following examples and embodiments describe determining the number of repetitions for Msg3 PUSCH for a UE, such as the UE 116, that is not in CE mode. In certain embodiments, a UE that is not configured for CE operation can also transmit a Msg3 PUSCH with repetitions. A number of repetitions can be signaled by higher layers (for example, either by a field in the RRC IE RACH-ConfigCommon or in RRC IE pusch-ConfigCommon). The number of repetitions for a Msg3 transmission can additionally or alternatively be indicated by a field in a DCI format scheduling a PDSCH reception providing a RAR message corresponding to the Msg3 PUSCH transmission, for example by indicating one number of repetitions from a set of numbers of repetitions provided by higher layers. The number of repetitions for a Msg3 PUSCH transmission can additionally or alternatively be indicated by a field in the UL grant of the RAR message scheduling the Msg3 PUSCH transmission. The number of repetitions for a Msg3 PUSCH transmission can alternatively be indicated by an entry in a time domain resource allocation (TDRA) table that, in addition to a start and length of a PUSCH transmission in a slot, it indicates a number of repetitions for the PUSCH transmission. For Msg3 PUSCH transmissions, the TDRA table can be provided by a SIB.

In certain embodiments, if the number of repetitions is both (i) configured by higher layers and (ii) signaled by a field either in the DCI format scheduling the PDSCH reception with the RAR message or in the UL grant of the RAR message, the UE transmits a Msg3 PUSCH with the number of repetitions indicated by the field. For example, the UE can determine the number of repetitions for the Msg3 PUSCH transmission following a similar procedure as described above in FIG. 6 and FIG. 7, with the difference being that the UE operates in normal, non-CE, coverage mode and is not associated to a CE level.

In certain embodiments, a field carrying the number of Msg3 PUSCH repetition cannot be present both in the DCI format scheduling the RAR PDSCH reception and in the UL grant of the RAR message in the PDSCH reception.

For example, a UE, such as the UE 116, is not expected to be indicated the number of repetitions for Msg3 PUSCH transmission in the DCI format scheduling the RAR PDSCH reception and in the UL grant of the RAR message in the PDSCH reception.

For another example, a UE, such as the UE 116, is not expected to receive the indication of number of repetitions for Msg3 PUSCH transmission in the UL grant of the RAR message in the PDSCH reception when the UE receives the indication in the DCI format scheduling the RAR PDSCH reception.

For yet another example, if a UE, such as the UE 116, receives the indication of number of repetitions for Msg3 PUSCH transmission in the DCI format scheduling the RAR PDSCH reception, the UE discards the indication of Msg3 PUSCH repetitions in the UL grant of the RAR message in the PDSCH reception if present.

Embodiments of the present disclosure provide for determination of the number of repetitions for Msg3 when the random access procedure is initiated by a PDCCH order. The following examples and embodiments describe determining the number of repetitions for Msg3 when the random access procedure is initiated by a PDCCH order. For example, a gNB, such as the BS 102, can trigger a UE, such as the UE 116, to initiate a random access procedure through a PDCCH order. The UE may or may not be configured for CE operation. A UE interprets that a DCI format 1_0 is a PDCCH order for a PRACH transmission if the cyclic redundancy check (CRC) is scrambled by cell radio network temporary identifier (C-RNTI) and a value of a "Frequency domain resource assignment" field is all ones. Such a DCI format can also include a field to indicate a number of repetitions for a Msg3 PUSCH transmission, for example "Msg3-rep indicator" field of n bits. For example, the TDRA field can be interpreted as providing a number of repetitions for the PRACH transmission. The Msg3-rep indicator field can indicate one number of repetitions from a set of numbers of repetitions provided by higher layers or can directly indicate the number of repetitions.

The Msg3-rep indicator field of n bits can use n bits of the "Reserved bits" field of such DCI format, such as for example the bits of the TDRA field. For CBRA, where UEs within a serving cell can share same RA resources, the "Random Access Preamble index" field of the DCI format 1_0 used to initiate the RA procedure is all zeros. In such case, the "synchronization signal/physical broadcast channel (SS/PBCH) index" field and the "PRACH Mask index" field of the DCI are reserved. It is possible that the Msg3-rep indicator field uses n bits, with n<=4, of the PRACH Mask index field if the value of the Random Access Preamble index field is all zeros, in which case the PRACH Mask index field is reserved. It is also possible that the Msg3-rep indicator field uses n bits, with n<=6, of the SS/PBCH index field if the value of the Random Access Preamble index field is all zeros, in which case the SS/PBCH index field is reserved.

Embodiments of the present disclosure provide for transmission of Msg3 with repetitions: redundancy version. The following examples and embodiments describe transmitting Msg3 with repetitions based on a redundancy version. In certain embodiments, if a UE, such as the UE 116, transmits a Msg3 PUSCH with $N_{rep}$ repetitions, for the first transmission the UE transmits a transport block in a PUSCH scheduled by a RAR UL grant in a corresponding RAR message using redundancy version number $rv_{id}$ 0.

For all repetitions, the UE transmits the transport block in a PUSCH using redundancy version number 0. Alternatively, for the $n^{th}$ repetition, with n=1, . . . , $N_{rep}$-1, the UE transmits the transport block in a PUSCH using different redundancy version number, for example according to the sequence {0,2,3,1} as illustrated in TABLE 1, below. Examples for other sequences include {2,3,1,0}, {3,1,0,2}, {1,0,2,3}, {0,3,0,3}. The RV pattern can be provided by higher layers such as for example a SIB. Alternatively, a pattern for RVs can be indicated from a predetermined set of patterns of RVs for repetitions, by a field in the DCI format scheduling the Msg3 PUSCH transmission with the number of repetitions.

TABLE 1

| 1. $rv_{id}$ of the initial PUSCH transmission of Msg3 | 2. $rv_{id}$ to be applied to $n^{th}$ repetition | | | |
|---|---|---|---|---|
| | 3. n mod 4 = 0 | 4. n mod 4 = 1 | 5. n mod 4 = 2 | 6. n mod 4 = 3 |
| 7. 0 | 8. 0 | 9. 2 | 10. 3 | 11. 1 |

Alternatively, for all the repetitions within one PUSCH slot, the UE, such as the UE 116, transmits the transport block using the same redundancy version number. Transmissions in consecutively allocated slots can use a different redundancy version as shown in TABLE 2, below. Examples for other sequences/patterns include {2,3,1,0}, {3,1,0,2}, {1,0,2,3}, {0,3,0,3}.

TABLE 2

| 12. $rv_{id}$ of the initial PUSCH transmission of Msg3 | 13. $rv_{id}$ to be applied to all repetitions within the $n^{th}$ slot | | | |
|---|---|---|---|---|
| | 14. n mod 4 = 0 | 15. n mod 4 = 1 | 16. n mod 4 = 2 | 17. n mod 4 = 3 |
| 18. 0 | 19. 0 | 20. 2 | 21. 3 | 22. 1 |

Whether the redundancy version number is fixed to $rv_{id}=0$ for all repetitions or changes it can be indicated by higher layers or can be indicated by a field in a DCI format scheduling the Msg3 PUSCH transmission.

In certain embodiments, one or more parameters in the RRC IE RACH-ConfigCommon (or in RRC IE pusch-ConfigCommon) can provide the $rv_{id}$ for the Msg3 PUSCH transmission. For example, a UE, such as the UE 116, can be indicated whether the $rv_{id}$ is always zero for all repetitions of the Msg3 PUSCH transmission or whether the $rv_{id}$ varies, such as, according to the TABLE 1 or TABLE 2, above. In certain embodiments, the UE can also be indicated whether: (i) the $rv_{id}$ changes at each repetition (TABLE 1 is used); (ii) the $rv_{id}$ is fixed for repetitions in a same slot and changes for repetitions in consecutive slots (TABLE 2 is used); or (iii) the $rv_{id}$ changes per number of repetitions where the number of repetitions can be provided by higher layers or be predetermined in the system operation. The UE can be also indicated a default $rv_{id}$ sequence.

Embodiments of the present disclosure provide for association of number of Msg3 repetitions (or CE level) with PUSCH repetition type. The following examples and embodiments describe associating a number of Msg3 repetitions (or CE level) with PUSCH repetition type. In certain embodiments, for a Msg3 PUSCH transmission with repetitions that is scheduled by an UL grant in a RAR message, a number of consecutive PUSCH allocations within a slot and a number of consecutive slots allocated for the Msg3 transmission can be provided by higher layers. In case of an allocation of multiple slots, a same start symbol and length for PUSCH repeats over the allocated slots. In each slot, one (PUSCH repetition Type A) or more (PUSCH repetition Type B) Msg3 repetitions can be transmitted.

In a first approach, for a UE transmitting Msg3 with repetitions, PUSCH type B repetitions can be used in order to reduce a time required for the Msg3 PUSCH transmission. Depending on the number of repetitions or on the CE level, a UE, such as the UE 116, can transmit Msg3 with PUSCH repetition Type A or PUSCH repetition Type B. Whether to use repetition type B for a Msg3 PUSCH transmission can depend on whether performance or latency is prioritized. For example, if there are two CE levels l=0, 1, when the UE operates in CE level 0 the UE can transmit Msg3 repetitions with PUSCH repetition Type A when the UE operates in CE level 0 and transmit Msg3 repetitions with PUSCH repetition Type B when the UE operates in CE level 1. In another example, if there are four CE levels, l=0, 1, 2, 3, the UE can transmit Msg3 repetitions with PUSCH repetition Type B when the UE operates in CE level 3, otherwise, the UE can transmit MSg3 repetitions with PUSCH repetition Type A.

A gNB, such as the BS 102, can indicate whether PUSCH repetition Type A or PUSCH repetition Type B is used through a SIB. Alternatively, if not all UEs can support a PUSCH repetition Type, such as PUSCH repetition Type B, PUSCH repetition Type A is used by default. It is also possible for a UE, such as the UE 116, to indicate a PUSCH repetition Type by selecting a PRACH preamble. For example, the gNB can indicate in a SIB that a first set of PRACH preambles are associated with PUSCH repetition Type A and a second (remaining) set of PRACH preambles are associated with PUSCH repetition Type B. The UE transmits a Msg3 PUSCH with Type A or with Type B repetitions depending on whether the UE selects a PRACH preamble from the first set or from the second set of PRACH preambles.

Embodiments of the present disclosure provide for transmission of Msg3 with repetitions: time domain resource allocation. The following examples and embodiments describe transmitting Msg3 with repetitions in a time domain resource allocation. In certain embodiments, a UE, such as the UE 116, can determine a time domain resource allocation for a Msg3 PUSCH transmission from higher layer parameters and from the TDRA tables. Table 6.1.2.1.1-1A and Table 6.1.2.1.1-1B in TS 38.214 v16.1.0 define PUSCH time domain resource allocation configurations for a UE to apply.

The following descriptions apply to any PUSCH transmission, not only to Msg3 PUSCH transmission. In certain embodiments, a number of Msg3 repetitions (or CE level) are associated with K2. For example, a CE level, or equivalently a number of repetitions for a Msg3 PUSCH transmission, can be associated with K2 which is used to derive a slot offset from the slot where PDCCH providing the DCI format scheduling the Msg3 PUSCH transmission is received. A UE operating with a large CE level (several repetitions for Msg3) is assumed to be more delay tolerant, and higher coverage levels can be associated with larger values of K2. For instance, if there are two CE levels, the association can be as in Table 3. Level 0 can correspond to the lowest CE level or to UE operating without CE. This can apply to both normal CP and extended CP.

In certain embodiments, a number of Msg3 repetitions (or CE level) are associated with K2 and S. For example, a CE level, or equivalently a number of repetitions for a Msg3 PUSCH transmission, can be associated to K2 and S. S is a first symbol in a slot in which the UE transmits the Msg3 PUSCH. For instance, if there are two CE levels, the association can be as in Table 4. The lowest CE level is associated with the smaller K2 and S values. Level 0 can correspond to the lowest CE level or to a UE operating in normal mode (no CE). This can apply to both normal CP and extended CP.

In certain embodiments, a number of Msg3 repetitions (or CE level) are associated with S. For example, a CE level, or equivalently a number of repetitions for a Msg3 PUSCH transmission, can be associated to S. S is a first symbol in a slot in which the UE transmits the Msg3 PUSCH. For instance, if there are four CE levels, the association can be as in Table 5. The lowest CE level is associated with the smaller S value. Level 0 can correspond to the lowest CE level or to a UE operating in normal mode (no CE). This can apply to both normal CP and extended CP.

In certain embodiments, a number of Msg3 repetitions are associated with a time domain resource allocation configuration. For example, a number of TDRA tables can be defined, each corresponding to a CE level. Each TDRA table defines which PUSCH time domain resource allocation configuration to apply when a UE operates in a CE level. The indication of which TDRA table to use can be indicated in a field in the IE PUSCH-ConfigCommon which is used to configure the cell specific PUSCH parameters. For instance, as illustrated below, a Msg3-PUSCH-TimeDomainAllocationTable field can indicate a TDRA table. The value of this field can correspond to the configured CE level. Further, an indication of a CE level can be dynamic through an indication of a TDRA table from a configured set of TDRA tables. For instance, a field in a DCI format (UL grant) scheduling a PUSCH transmission can indicate a TDRA table from a set of 2 or 4 TDRA tables. The field can be part of the TDRA field or can be a separate field. In the former case, the TDRA field indicates a subset of entries of a TDRA table where the subset of entries can be predetermined. For instance, when 1 bit of the TDRA field is used to indicate one of two TDRA tables, the remaining bits of the TDRA field can be used to indicate every other entry (one entry every two consecutive entries) from the TDRA table.

In certain embodiments, a UE that is not configured for CE operation can also transmit a Msg3 PUSCH with repetitions. A Msg3 PUSCH transmission with repetitions can be associated with a PUSCH mapping type and a TDRA table. One or more TDRA tables can be defined with each TDRA table defining which PUSCH time domain resource allocation configuration to apply for Msg3 PUSCH transmission. The indication of which TDRA table to use can be indicated in a field in the IE PUSCH-ConfigCommon which is used to configure the cell specific PUSCH parameters or by a field in the DCI format (UL grant) scheduling the PUSCH transmission. For example, as illustrated below, a field Msg3-PUSCH-TimeDomainAllocationTable can indicate a TDRA table. For example, as illustrated in Syntax (1) below, a field Msg3-PUSCH-TimeDomainAllocation can indicate a combination of PUSCH mapping type, slot offset, start symbol and length from the TDRA table. In addition, or alternatively, similar fields can be added in the IE PUSCH-ConfigCommon for PUSCH repetitions as indicated below.

PRACH resources, wherein the partitioning/mapping is associated with PRACH preambles, or with PRACH occasions, or with both PRACH preambles and ROs, and wherein resources from a partition are selected by UEs supporting Msg3 PUSCH transmission with repetitions and resources from another partition are selected by UEs not supporting Msg3 PUSCH transmission with repetitions.

A partitioning of PRACH resources can be associated with multiple features supported by the UE. For example, PRACH resources in a partition can be used by UEs that support Msg3 PUSCH transmission with repetitions and support transmission of PRACH preambles over multiple spatial settings, wherein same or different preambles are transmitted by cycling over a number of spatial settings. In another example a partition of PRACH resources can be used by UEs that support Msg3 PUSCH transmission with repetitions and support transmission of a channel quality report in Msg3 PUSCH, wherein the channel quality report is based on a channel state information reference signal (CSI-RS) transmission and/or on synchronization signal physical broadcast channel (SSB) transmissions by a gNB. In another example a partition of PRACH resources is associated with the transmission of PRACH preambles with a first number of repetitions and with Msg3 PUSCH transmission with a second number of repetitions.

In certain embodiments, the identification can use UL BWP. Identification of UEs supporting Msg3 with repetitions by a gNB, such as the BS 102, can be based on UL bandwidth. A gNB can configure different UL BWPs wherein one or more BWPs are associated with Msg3 PUSCH transmission without repetitions and one or more BWPs are associated with Msg3 PUSCH transmission without repetitions. The different BWPs can also be associated with PRACH transmission with or without repetitions. A gNB can configure in a SIB different UL BWPs correspond-

```
              Syntax                                                            (1)
-- ASN1START
-- TAG-PUSCH-CONFIGCOMMON-START
PUSCH-ConfigCommon ::=    SEQUENCE {
    groupHoppingEnabledTransformPrecoding   ENUMERATED {enabled}
        OPTIONAL, -- Need R
    pusch-TimeDomainAllocationList          PUSCH-TimeDomainResourceAllocationList
        OPTIONAL, -- Need R
    msg3-DeltaPreamble           INTEGER (-1..6)         OPTIONAL, -- Need R
    p0-NominalWithGrant          INTEGER (-202..24)      OPTIONAL, -- Need R
Msg3-PUSCH-TimeDomainAllocationTableINTEGER (1..maxNrofUL-
        AllocationTables)OPTIONAL, -- Need R
        Msg3-PUSCH-TimeDomainAllocation          INTEGER (1..maxNrofUL-Allocations)
            OPTIONAL, -- Need R
        PUSCH-TimeDomainAllocationTable          INTEGER (1..maxNrofUL-
            AllocationTables)    OPTIONAL, -- Need R
        PUSCH-TimeDomainAllocation               INTEGER (1..maxNrofUL-Allocations)
            OPTIONAL, -- Need R
    ...
}
-- TAG-PUSCH-CONFIGCOMMON-STOP
-- ASN1STOP
```

Embodiments of the present disclosure provide for identification of UEs supporting transmission of Msg3 PUSCH with repetitions. The following examples and embodiments describe identifying UEs supporting transmission of Msg3 PUSCH with repetitions. In certain embodiments, the identification can use PRACH resources. For example, a gNB, such as the BS 102, can identify whether a UE, such as the UE 116, supports transmissions of Msg3 PUSCH with repetitions from the PRACH resources used by the UE to initiate a RA procedure. The gNB can indicate in a system information block (SIB) a partitioning/mapping of the ing to different numbers of repetitions for Msg3 PUSCH transmission and for PRACH repetitions. A UE can select an UL BWP for initial access depending on whether the UE supports repetitions of Msg3 PUSCH or not. When a UE supports transmission of Msg3 PUSCH with repetitions and multiple BWPs are available, the UE can select a BWP based on RSRP measurements. In the selected BWP, the UE transmits PRACH preambles, and upon reception of a RAR, Msg3 PUSCH.

Different BWPs can also be associated with different CE levels where each coverage level corresponds to a number of repetitions for Msg3 PUSCH transmission and to a number of PRACH preamble repetitions. The number of Msg3 repetitions and the number of PRACH repetitions can be different for different UL BWPs (and corresponding CE levels) or can be the same for some of the BWPs.

In certain embodiments, a gNB, such as the BS 102, can also configure different narrow bandwidths (NBs) of a BWP where a NB can be associated with the transmission of Msg3 and PRACH either with repetitions or with no repetitions. For example, a gNB can configure an UL BWP associated with Msg3 PUSCH transmission with no repetitions and configure another UL BWP associated with Msg3 PUSCH transmission with repetitions, wherein the UL BWP comprises a number of NBs. The number of repetitions for Msg3 PUSCH and/or PRACH preamble transmissions associated with the different NBs of a BWP can be same or different. A UE, such as the UE 116, that supports Msg3 transmission with repetitions would choose one of the NBs for UL transmission based on RSRP measurements.

Figure 9A:
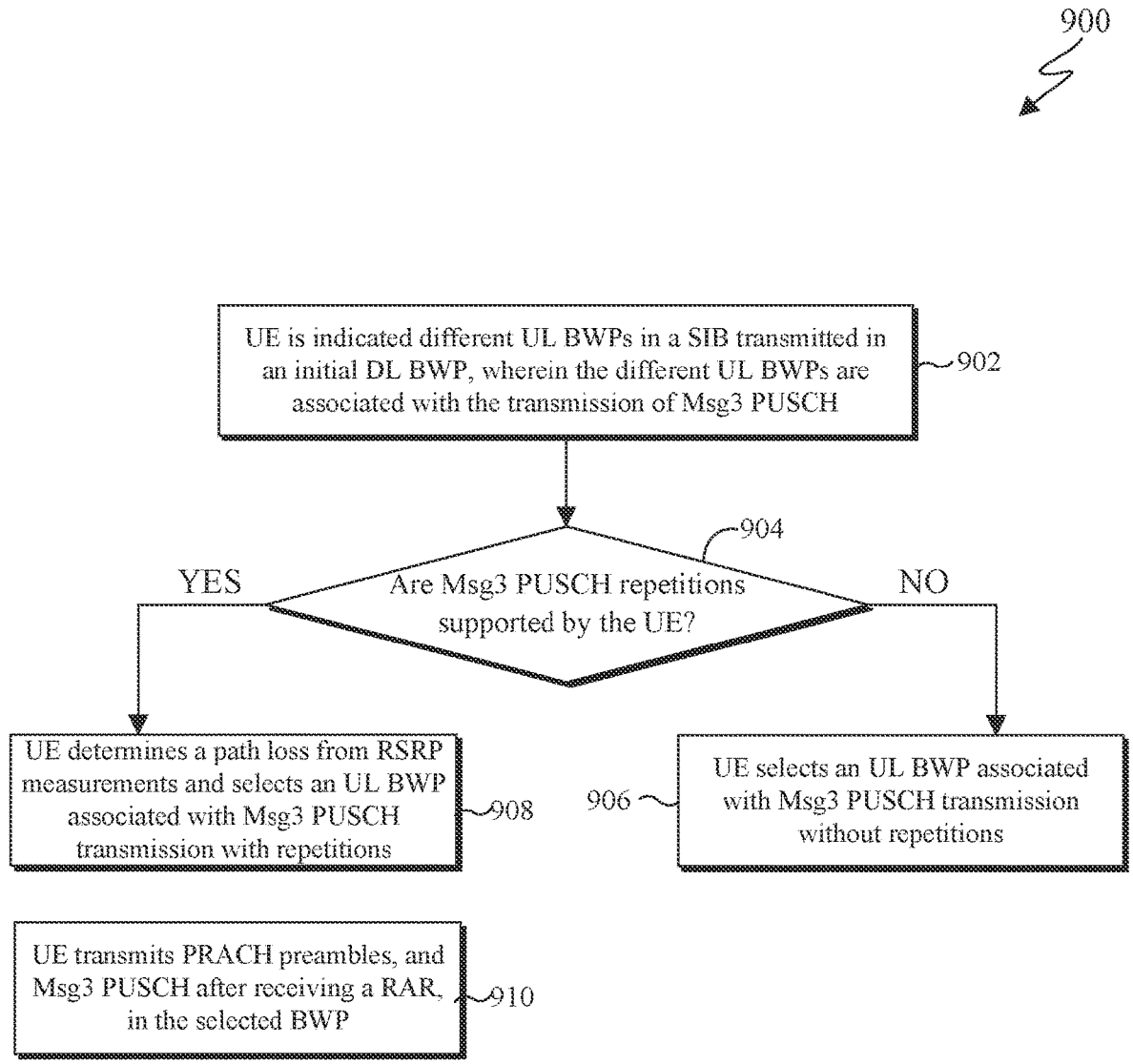
FIGS. 9A and 9B illustrate example methods for identifying whether a UE supports Msg3 PUSCH transmissions according to embodiments of the present disclosure.
Figure 9B:
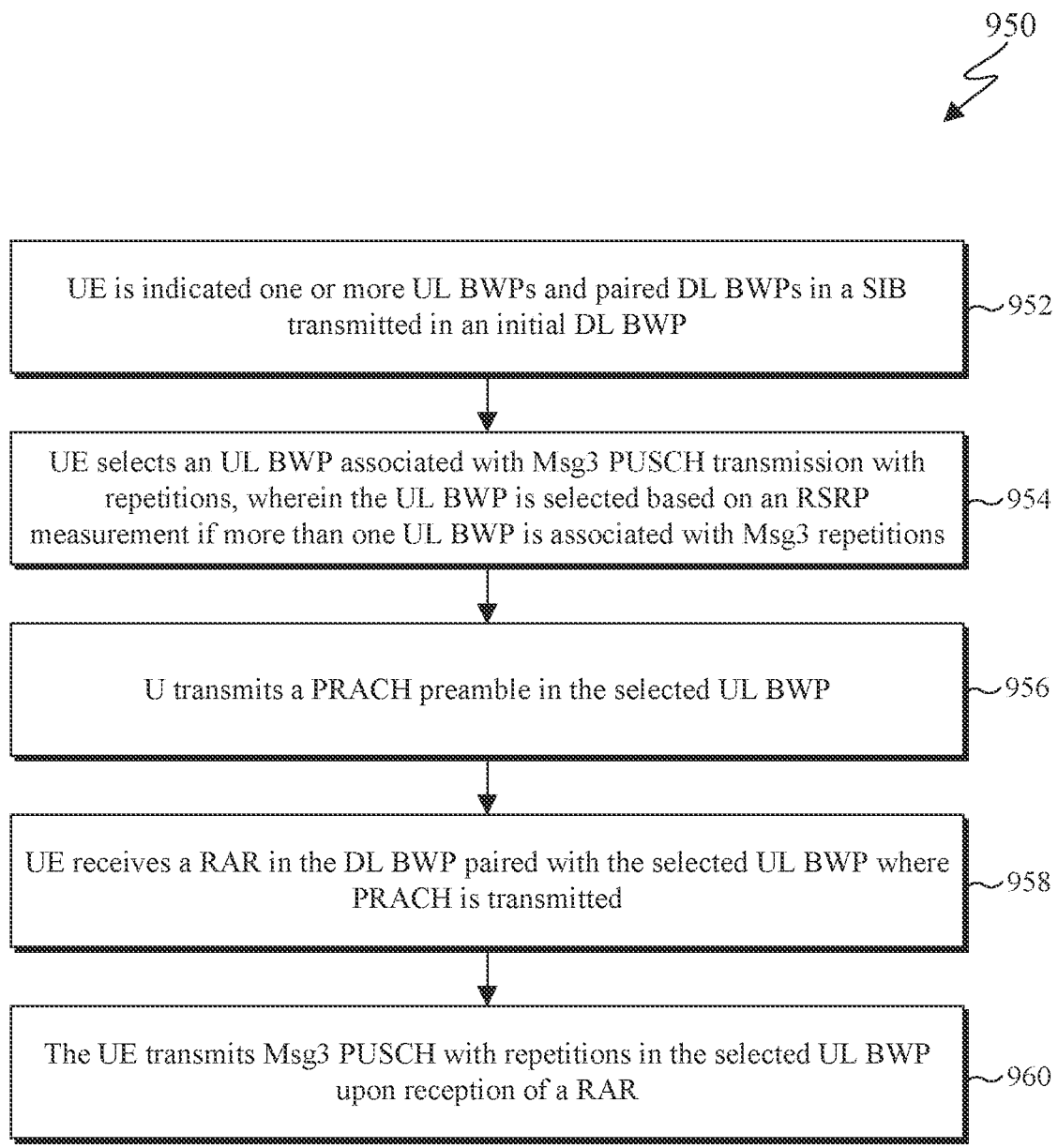

FIGS. 9A and 9B illustrate example methods 900 and 950, respectively, for identifying whether a UE supports Msg3 PUSCH transmissions according to embodiments of the present disclosure. For example, the steps of the methods 900 and 950 can be performed by any of the UEs 111-116 of FIG. 1, such as the UE 116 of FIG. 3. The methods 900 and 950 are for illustration only and other embodiments can be used without departing from the scope of the present disclosure.

As illustrated in FIG. 9A, the method 900 describes identifying, by a gNB, whether a UE supports Msg3 PUSCH transmission with repetitions is based on the UL BWP (or NB) used for PRACH transmission. Based on what the UE selects, the gNB can identify whether a UE supports Msg3 PUSCH transmission with repetitions.

In step 902, a UE is indicated different UL BWPs in a SIB transmitted in an initial DL BWP, wherein the different UL BWPs are associated with the transmission of Msg3 PUSCH. For example, UE receives different UL BWPs in a SIB from an DL BWP.

In step 904, the UE determines whether Msg3 PUSCH repetitions are supported. If the UE does not support Msg3 PUSCH transmission with repetitions (as determined in step 904), then in step 906, the UE selects an UL BWP associated with Msg3 PUSCH transmission without repetitions. Alternatively, if the UE supports Msg3 PUSCH transmission with repetitions, then in step 908, the UE determines a path loss from RSRP measurements and selects an UL BWP among the indicated UL BWPs associated with Msg3 PUSCH transmission with repetitions. Then in step 910, the UE transmits PRACH preambles, and Msg3 PUSCH after receiving a RAR, in the selected BWP.

In another example for TDD systems, in addition to the indication of different UL BWPs that is transmitted in an initial DL BWP with CORESET0, the gNB, such as the BS 102, also indicates another DL BWP with another CORESET0 associated with an UL BWP. For example, a gNB can indicate in a SIB transmitted in an initial DL BWP (i) an UL BWP (UL BWP-1) associated with Msg3 with repetitions and paired with the initial DL BWP, (ii) an UL BWP (UL BWP-2) associated with Msg3 with no repetitions, and (iii) a DL BWP with another CORESET0 paired with the UL BWP-2. Additionally, an UL BWP can be associated with transmission of PRACH repetitions, and/or with transmission in different number of spatial settings. A UE that supports Msg3 PUSCH with repetitions would select UL BWP-1 and transmit a PRACH preamble in BWP-1. A UE can select an UL BWP for initial access depending on (i) whether the UE supports repetitions of Msg3, (ii) whether the UE supports transmission of PRACH preambles over different spatial settings, (iii) an RSRP measurement that determines the number of repetitions of a Msg3 and/or (iv) a PRACH preamble.

As illustrated in FIG. 9B, the method 950 describes an example where identification by a gNB of whether a UE supports Msg3 PUSCH transmission with repetitions is based on an UL BWP (or NB) used for PRACH transmission, wherein the UL BWP and paired DL BWP are indicated in a SIB.

In step 952 a UE is indicated one or more UL BWPs and paired DL BWPs in a SIB transmitted in an initial DL BWP, wherein at least one UL BWP is associated with Msg3 PUSCH transmission with repetitions. For example, the UE receives one or more UL BWPs and paired DL BWPs in a SIB transmitted in an initial DL BWP. In step 954, the UE selects an UL BWP associated with Msg3 PUSCH transmission with repetitions. The UL BWP is selected based on an RSRP measurement if more than one UL BWP is associated with Msg3 repetitions. In step 956, the UE transmits a PRACH preamble in the selected UL BWP. In step 958, the UE receives a RAR in the DL BWP paired with the selected UL BWP where PRACH is transmitted. In step 960, the UE transmits Msg3 PUSCH with repetitions in the selected UL BWP upon reception of a RAR.

Although FIG. 9A illustrates the method 900 and FIG. 9B illustrates the method 950, various changes may be made to FIGS. 9A and 9B. For example, while methods 900 and 950 are shown as a series of steps, various steps could overlap, occur in parallel, occur in a different order, or occur multiple times. In another example, steps may be omitted or replaced by other steps. For example, steps of the method 900 can be executed in a different order. For another example, steps of the method 950 can be executed in a different order.

Embodiments of the present disclosure provide for retransmissions of Msg3 PUSCH. The following examples and embodiments describe retransmissions of Msg3 PUSCH. In certain embodiments, after a UE transmits a Msg3 PUSCH, if a gNB does not successfully receive Msg3 PUSCH, the UE can receive a PDCCH with a CRC scrambled by the TC-RNTI (or C-RNTI) requesting a retransmission of Msg3. A retransmission of Msg3 PUSCH can use a same or different number of repetitions used in an initial transmission. The UE can transmit Msg3 with a number of repetitions derived from the number of repetitions of the initial transmission. For example, in each retransmission a UE can use an increased number of repetitions, or all retransmissions use the same number of repetitions. The number of repetitions to use in Msg3 retransmissions can be configured in SIB and be part of the Msg3 configuration in pusch-ConfigCommon. It can also be used the same number of repetitions for PRACH preambles configured in RACH-ConfigCommon. In certain embodiments, the UE determines the number of repetitions for a Msg3 retransmission from the DCI format scheduling the Msg3 PUSCH retransmission. A UE can also determine the number of repetitions to use for a Msg3 PUSCH retransmission based on RSRP measurements and configured threshold(s). A Msg3 PUSCH retransmission can be transmitted with no repetitions, or with a number of repetitions same as or smaller/larger than a number of repetitions in a previous (re-)transmission depending on whether an RSRP estimate is same as, or above or below a threshold. In certain embodiments, a gNB configures the use of repetitions for Msg3 PUSCH transmission only for the initial transmission, and retransmissions of Msg3 PUSCH are without repetitions, or vice versa (repetitions are used only in retransmissions).

Embodiments of the present disclosure provide for a number of repetitions defined by a number of symbols and determination of UL symbols for transmission of PUSCH with repetitions. The following examples and embodiments describe determining UL symbols for transmission of PUSCH with repetitions where the number of repetitions are defined by a number of symbols. A CE level, or equivalently a number of repetitions, for a PUSCH transmission such as a Msg3 PUSCH transmission can be defined by a number of slots or by a number of symbols.

In certain embodiments, using a number of symbols $N_{PUSCH}=L \cdot N_{nominal}$ to determine a length of a PUSCH transmission with Type-B repetitions and having $N_{nominal}$ repetitions can be beneficial in scenarios where all symbols used for the PUSCH transmission are not known in advance by a scheduling gNB. For example, when the gNB, such as the BS 102, adapts the slot structure after the scheduling of the PUSCH transmission, flexible slot symbols that are indicated by an UL-DL TDD configuration provided by higher layers may be indicated to be DL symbols or flexible (reserved) symbols by a DCI format provided in a PDCCH transmission by the gNB.

For instance, a UE, such as the UE 116, can be scheduled to transmit a PUSCH with $N_{nominal}=4$ nominal repetitions over 4 corresponding slots with S=4 and L=11. The 4 slots can be the first 4 slots, starting from the slot indicated by $K_2$, where symbols 4 through 14 are flexible or UL.

If the gNB, such as the BS 102, subsequently indicates by a DCI format some of the flexible symbols to be DL symbols or flexible symbols, an actual repetition of the PUSCH transmission in a corresponding slot can avoid those symbols. However, if the repetitions of the PUSCH transmission are limited to 4 slots, the total number of symbols used for the PUSCH transmission will be smaller than $N_{PUSCH}$ and, as a consequence, a reception reliability for a transport block in the PUSCH transmission is reduced. The gNB can account for a potential reduction in a number of symbols for the PUSCH repetitions over 4 slots by indicating more than 4 slots for repetitions. However, that may also result to unnecessary repetitions and increased resource overhead in cases when the gNB does not indicate flexible symbols of an UL-DL TDD configuration provided by higher layers to be DL symbols or flexible symbols. Therefore, a UE configured for repetitions of a PUSCH transmission can also monitor PDCCH for detection of a DCI format indicating a slot structure, such as a DCI format 2_0, and avoid transmission in symbols that are indicated as DL. The UE may also avoid transmission in symbols indicated as flexible by the DCI format as such symbols can be considered to be reserved in the system operation and the UE may also avoid transmission in one or more symbols after a last DL symbol in order to allow a required time to perform DL-to-UL switching at least when the UE needs to receive, for example a CSI-RS, during the last DL symbol.

Figure 10:
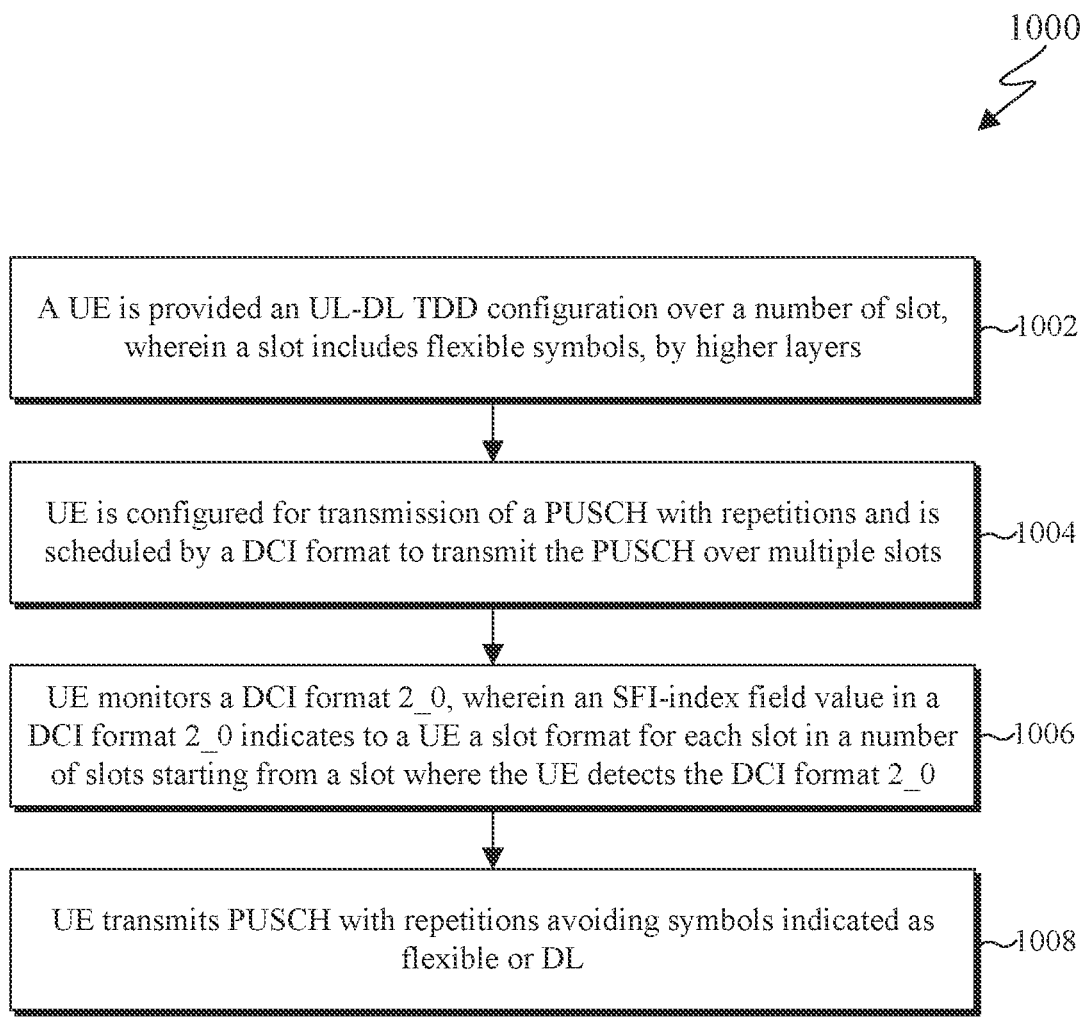
FIG. 10 illustrates an example method for determining UL symbols for transmission of PUSCH with repetitions according to embodiments of the present disclosure.

FIG. 10 illustrates an example method 1000 for determining uplink (UL) symbols for transmission of PUSCH with repetitions according to embodiments of the present disclosure. For example, the steps of the method 1000 can be performed by any of the UEs 111-116 of FIG. 1, such as the UE 116 of FIG. 3. The method 1000 of FIG. 10 is for illustration only and other embodiments can be used without departing from the scope of the present disclosure.

As illustrated in FIG. 10, the method 1000 describes a procedure for a UE, such as the UE 116, to determine UL symbols for transmission of PUSCH with repetitions.

In step 1002, a UE receives or is provided with an UL-DL TDD configuration over a number of slots. Here, a slot includes flexible symbols, for example by the parameter tdd-UL-DL-ConfigurationCommon, or additionally by the parameter tdd-UL-DL-ConfigurationDedicated.

In step 1004, the UE is configured for transmission of a PUSCH with repetitions and is scheduled by a DCI format to transmit the PUSCH over multiple slots.

In step 1006, the UE monitors a DCI format 2_0 that provides an adaptation to the flexible symbols. For example, a slot format indicator (SFI) index field value in a DCI format 2_0 indicates to the UE a slot format for each slot in a number of slots starting from a slot where the UE detects the DCI format 2_0. The DCI format 2_0 adapts a flexible symbol of the UL-DL TDD configuration in a slot to either downlink, or uplink, or unavailable.

In step 1008, the UE transmits PUSCH with repetitions avoiding symbols indicated as flexible or DL 840 by the SFI-index field value in the DCI format 2_0.

The UE behavior can be further conditioned based on whether the UE transmits the PUSCH with repetitions. When the UE does not transmit the PUSCH with repetitions, the UE does not avoid symbols indicated as flexible or DL for the PUSCH transmission; otherwise, and at least for repetitions after the first repetition, the UE transmit the PUSCH with repetitions avoiding symbols indicated as flexible or DL by the SFI-index field value.

Although FIG. 10 illustrates the method 1000, various changes may be made to FIG. 10. For example, while method 1000 of FIG. 10 is shown as a series of steps, various steps could overlap, occur in parallel, occur in a different order, or occur multiple times. In another example, steps may be omitted or replaced by other steps. For example, steps of the method 1000 can be executed in a different order.

Determination of a number of slots for transmission of PUSCH with repetitions. The following examples and embodiments describe determining a number of slots for transmission of PUSCH with repetitions. For such operating conditions, determining a number of slots for repetitions of a PUSCH transmission based on $N_{PUSCH}$ can enable full flexibility to a gNB (such as the BS 102) to indicate flexible symbols of an UL-DL TDD configuration. The configuration can be provided by higher layers to be flexible (reserved) symbols or DL symbols while ensuring a desired reception reliability of a transport block in the PUSCH transmission without additional resource overhead. For example, when symbols eight through ten of the four slots in the above example are indicated as flexible or DL by the DCI format, the actual repetitions of the PUSCH transmission can be in symbols three through seven and 11 through 14 (or symbol three and symbol 11 can be additionally avoided to allow for DL-to-UL switching time of one symbol). Then, to accommodate for the three symbols without PUSCH transmission over the four slots, the actual repetitions can continue in slots after the four slots until the PUSCH transmission is over an additional 12 symbols and over a total number of $N_{PUSCH}=44$ symbols. Therefore, based on an indication of $N_{nominal}$ nominal repetitions with starting symbol S and length L, a UE can determine a total number of $N_{PUSCH}$ symbols for repetitions of the PUSCH transmissions as described in Equation (1), below.

$$N_{PUSCH}=L \cdot N_{nominal} \quad (1)$$

In certain embodiments, a UE (such as the UE 116) can determine the $N_{PUSCH}$ symbols for repetitions of the PUSCH transmissions and perform a minimum number of actual repetitions of the PUSCH transmission that achieve transmission over $N_{PUSCH}$ symbols starting from symbol S in a first slot.

As a gNB (such as the BS 102) may not have full control of the number of slots where the UE transmits the PUSCH, the gNB can configure by higher layers the UE behavior. For example, the gNB can configure by higher layers the UE behavior for whether the UE determines an actual number of repetitions to be only in the four slots as in the example above or generally in a number of slots, n, indicated by the DCI format scheduling the PUSCH transmission or the UE determines an actual number of repetitions to include additional slots so that the number of symbols for the indicated nominal repetitions is achieved. The number of slots n can be equal to the number of repetitions, or to the number of slots for a PUSCH transmission with Type A repetitions. Alternatively, the gNB can indicate the UE behavior by a 1-bit field in the DCI format scheduling the PUSCH transmission. It is possible that the 1-bit field signaling is used to indicate whether more than one additional slot respect to the number of slots n indicated by the DCI format scheduling the PUSCH transmission can be used to transmit symbols for repetitions of the PUSCH transmissions. For example, the gNB can configure by higher layers that the UE can determine an actual number of repetitions to include additional slots and can indicate by a 1-bit field in the DCI format scheduling the PUSCH transmission whether a single slot or multiple slots can be used. Alternatively, the numbers of additional slots can be configured by higher layers, and the 1-bit signaling indicates which of the configured numbers of slots can be used to transmit symbols for repetitions of the PUSCH transmissions. Also, the gNB can configure by higher layers a default value for the numbers of additional slots that the UE can use to transmit symbols for repetitions of the PUSCH transmissions. The default value can be larger or equal to zero.

It is also possible that whether the UE can use additional slots, including the number of additional slots, with respect to the number of slots indicated by the DCI format scheduling the PUSCH transmission for transmission of a PUSCH with nominal repetitions depends on the CE level. For example, if four CE levels exist, the gNB can configure by higher layers that the UE can use additional slots only for the highest CE level and the gNB can also configure a number of additional slots. A single value for all CE levels or a value for each CE level of the additional number of slots can be configured. Same principles can apply to repetitions of a physical uplink control channel (PUCCH) transmission.

Figure 11:
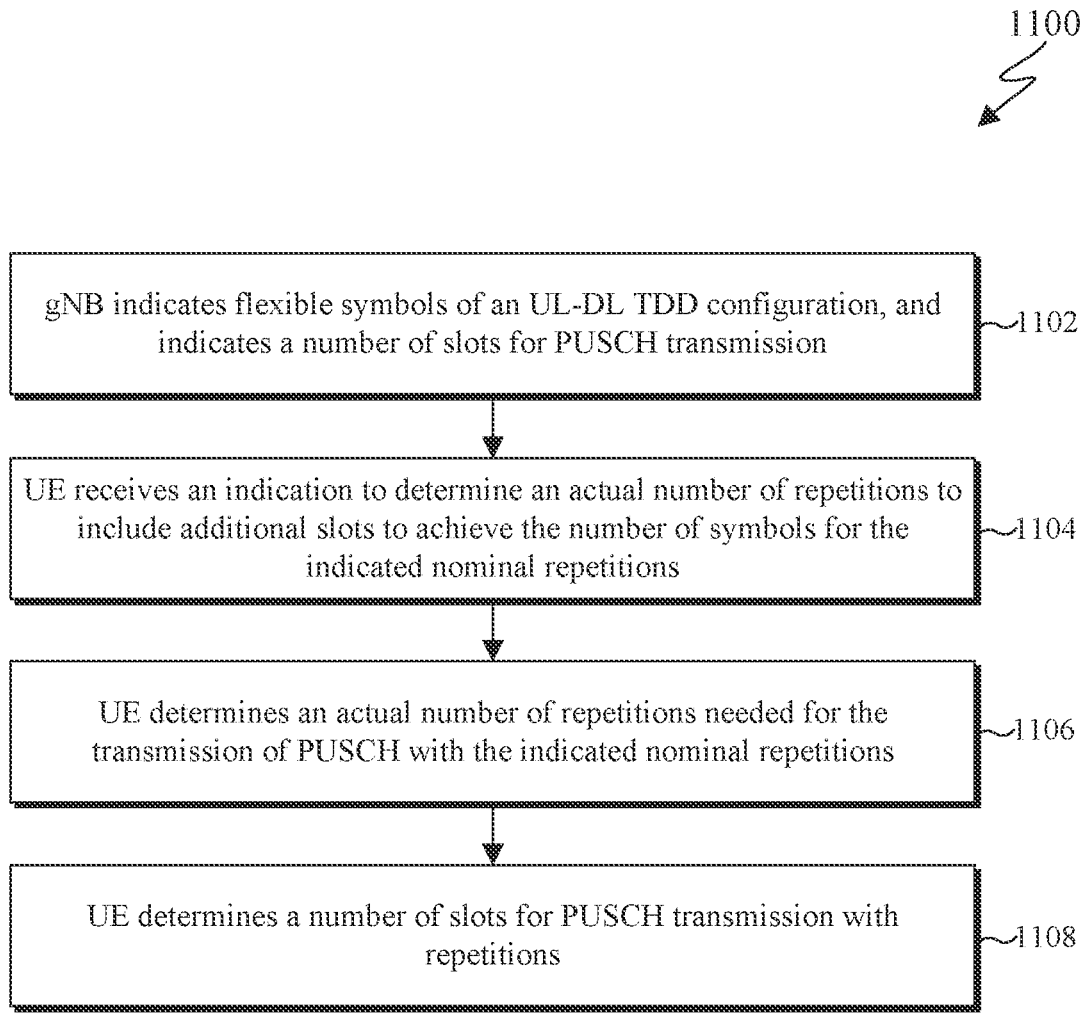
FIG. 11 illustrates an example method for determining repetitions for a PUSCH transmission according to embodiments of the present disclosure.

FIG. 11 illustrates an example method 1100 for determining repetitions for a PUSCH transmission according to embodiments of the present disclosure. For example, the steps of the method 1100 can be performed by any of the UEs 111-116 of FIG. 1, such as the UE 116 of FIG. 3. The method 1100 of FIG. 11 is for illustration only and other embodiments can be used without departing from the scope of the present disclosure.

As illustrated in FIG. 11, the method 1100 describes an exemplary procedure for a UE to determine repetitions for a PUSCH transmission. In step 1102, a gNB, such as the BS 102, indicates by a DCI format a set of symbols of an UL-DL TDD configuration to be flexible (reserved) symbols or DL symbols, and indicates a number of slots for a PUSCH transmission. In step 1104, the UE, such as the UE 116, receives an indication to determine an actual number of repetitions to include additional slots so that the number of symbols for the indicated nominal repetitions is achieved. Alternatively, UE can determine additional slots by default.

In step 1106, the UE determines a number of slots required for the transmission of PUSCH with the indicated nominal repetitions. In step 11008, the UE determines a number of slots for PUSCH transmission based on the required slots for transmission with the indicated nominal repetitions and on any further constraint in number of slots that can be used for PUSCH transmission.

An example of a further constraint can be the number of additional slots allowed for PUSCH transmission with repetitions respect to the number of slots indicated by the DCI format scheduling the PUSCH transmission. The UE, such as the UE 116, can then transmit with the minimum number of actual repetitions of the PUSCH transmission that achieve transmission over $N_{PUSCH}=L \cdot N_{nominal}$ symbols starting from symbol S in a first slot if the transmission is allowed in the slots required to transmit such $N_{PUSCH}$ symbols.

Although FIG. 11 illustrates the method 1100, various changes may be made to FIG. 11. For example, while method 1100 of FIG. 11 is shown as a series of steps, various steps could overlap, occur in parallel, occur in a different order, or occur multiple times. In another example, steps may be omitted or replaced by other steps. For example, steps of the method 1100 can be executed in a different order.

Embodiments of the present disclosure provide for determination of number of repetitions for PUSCH transmission based on the number of slots indicated by an SFI. The following examples and embodiments describe determining the number of repetitions for PUSCH transmission based on the number of slots indicated by an SFI. An SFI-index field value in a DCI format 2_0 indicates to a UE a slot format for each slot in a number of slots $N_{SFI}$ starting from a slot where the UE detects the DCI format 2_0. A UE determines a number of slots for repetitions of a PUSCH transmission based on the total number of symbols $N_{PUSCH}$ assuming that PUSCH transmission of actual repetitions avoids occupying symbols that are indicated as DL or reserved.

If the number of slots needed to complete $N_{nominal}$ actual repetitions is smaller than the $N_{SFI}$ slots, the UE (such as the UE 116) transmits $N_{nominal}$ actual repetitions avoiding transmission in symbols that are indicated as DL or reserved by a DCI format 2_0 and completes the transmission with all configured or indicated number of transmissions. If the number of slots needed to complete $N_{nominal}$ actual repetitions is larger than the $N_{SFI}$ slots as indicated by a first DCI format 2_0, the UE (such as the UE 116) transmits with the number of repetitions that can be completed in $N_{SFI}$ slots.

It is also possible that the UE transmits the PUSCH transmission with the $N_{nominal}$ repetitions and occupies a number of slots larger than the number of $N_{SFI}$ slots indicated by a first DCI format 2_0. The UE receives another DCI format 2_0 which indicates a slot format for slots subsequent to the slots whose format is indicated by the first DCI format 2_0, and UE transmits PUSCH symbols in symbols available for UL transmission as indicated by the second DCI format 2_0. A gNB (such as the BS 102) can configure by higher layers the UE behavior for whether the UE determines an actual number of repetitions to be only in $N_{SFI}$ slots indicated by a first DCI format 2_0 or UE determines an actual number of repetitions and transmits them.

Figure 12:
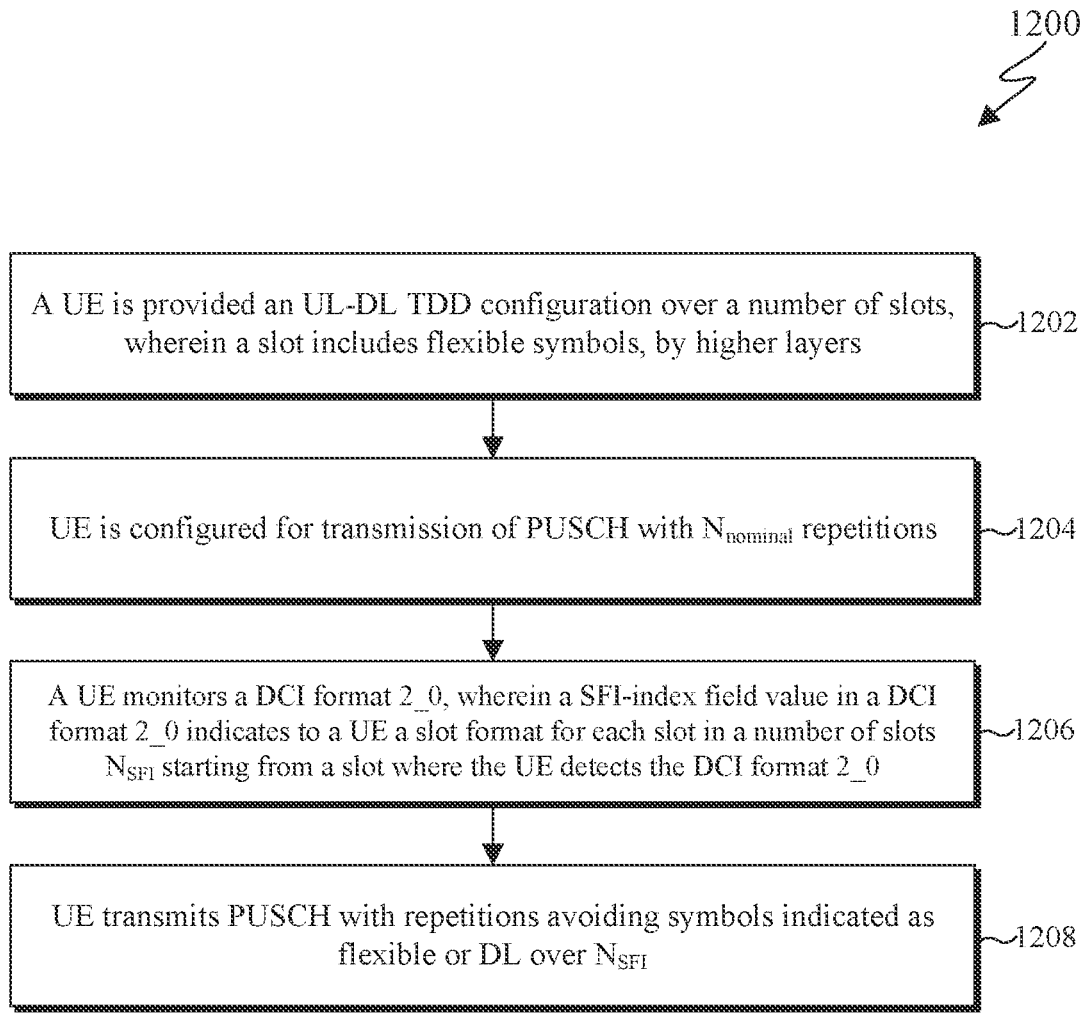
FIG. 12 illustrates an example method for determining the number of repetitions for PUSCH transmission according to embodiments of the present disclosure.

FIG. 12 illustrates an example method 1200 for determining the number of repetitions for PUSCH transmission according to embodiments of the present disclosure. For example, the steps of the method 1200 can be performed by any of the UEs 111-116 of FIG. 1, such as the UE 116 of FIG. 3. The method 1200 of FIG. 12 is for illustration only and other embodiments can be used without departing from the scope of the present disclosure.

As illustrated in FIG. 12, the method 1200 describes an exemplary procedure for the UE 116 to determine the number of repetitions for PUSCH transmission based on the number of slots $N_{SFI}$ that an SFI-index field value in a DCI format 2_0 indicates to a UE a slot format for each slot.

In step 1202, a UE is provided an UL-DL TDD configuration over a number of slots, wherein a slot includes flexible symbols, by higher layers, for example by the parameter tdd-UL-DL-ConfigurationCommon, or additionally by the parameter tdd-UL-DL-ConfigurationDedicated. In step 1204, the UE is configured for transmission of PUSCH with repetitions and is scheduled by a DCI format to transmit PUSCH over multiple slots. In step 1206, the UE monitors a DCI format 2_0. An SFI-index field value in a DCI format 2_0 is used to indicate to the UE a slot format for each slot in a number of slots $N_{SFI}$ starting from a slot where the UE detects the DCI format 2_0. In step 1208, the UE transmits the PUSCH with repetitions avoiding symbols indicated as flexible or DL over $N_{SFI}$ slots.

Although FIG. 12 illustrates the method 1200, various changes may be made to FIG. 12. For example, while method 1200 of FIG. 12 is shown as a series of steps, various steps could overlap, occur in parallel, occur in a different order, or occur multiple times. In another example, steps may be omitted or replaced by other steps. For example, steps of the method 1100 can be executed in a different order.

Figure 13:
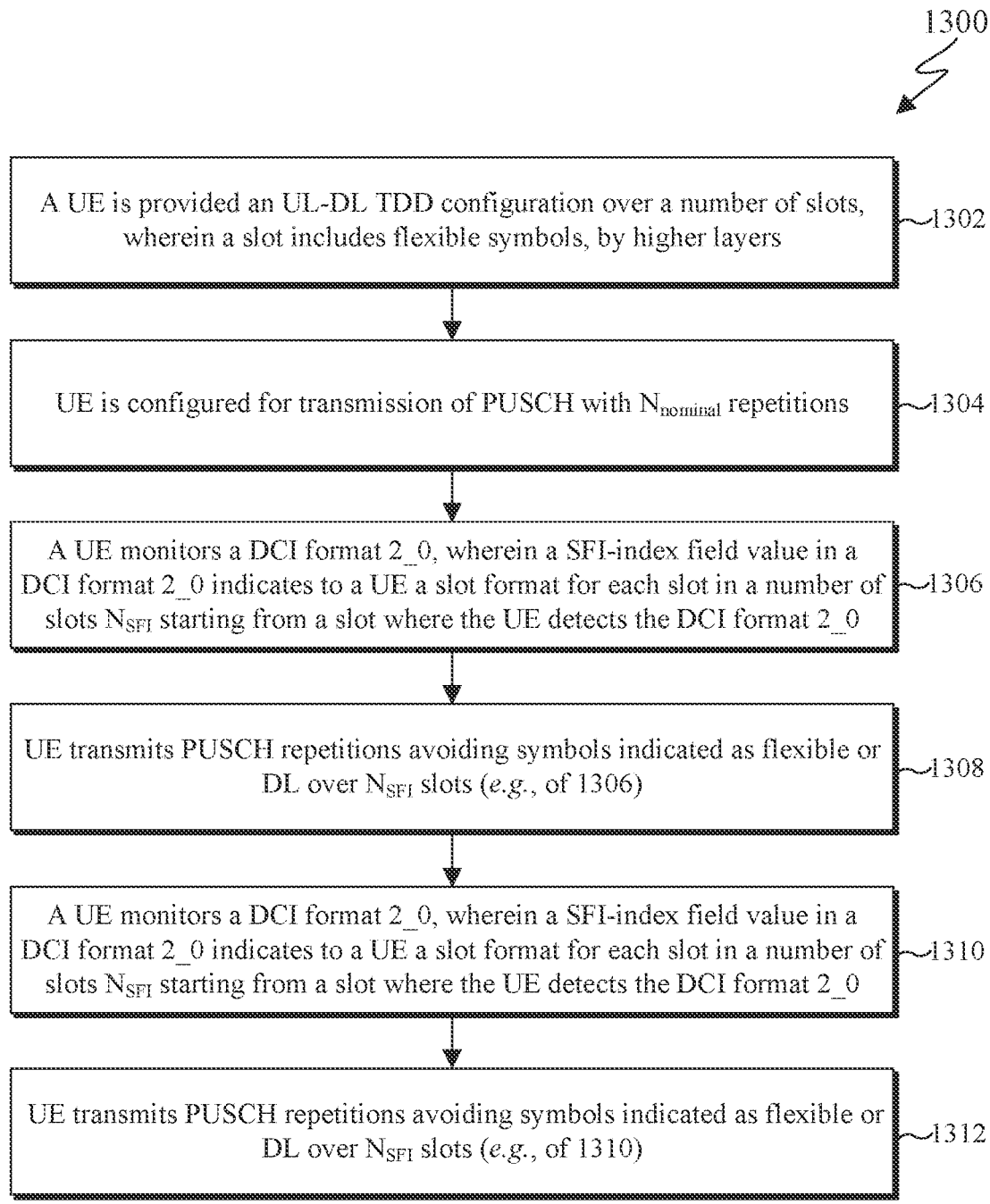
FIG. 13 illustrates an example method for transmitting PUSCH transmission according to embodiments of the present disclosure.

FIG. 13 illustrates an example method 1300 for transmitting PUSCH transmission according to embodiments of the present disclosure. For example, the steps of the method 1300 can be performed by any of the UEs 111-116 of FIG. 1, such as the UE 116 of FIG. 3. The method 1300 of FIG. 13 is for illustration only and other embodiments can be used without departing from the scope of the present disclosure.

As illustrated in FIG. 13, the method 1300 describes an exemplary procedure for a UE, such as the UE 116, to transmits PUSCH transmission with repetitions over a number of slots whose format is indicated by more than SFI-index field value in a DCI format 2_0. In this case the number of slots needed to complete the PUSCH transmission with repetitions is larger than the number of slots over which an SFI-index field value in a DCI format 2_0 has validity.

In step 1302, a UE (such as the UE 116) is provided an UL-DL TDD configuration over a number of slots, wherein a slot includes flexible symbols, by higher layers, for example by the parameter tdd-UL-DL-ConfigurationCommon, or additionally by the parameter tdd-UL-DL-ConfigurationDedicated. In step 1304, the UE is configured for transmission of PUSCH with repetitions. The UE can also be scheduled by a DCI format to transmit PUSCH over multiple slots. In step 1306, the UE monitors a DCI format 2_0. An SFI-index field value in a DCI format 2_0 indicates to a UE a slot format for each slot in a number of slots $N_{SFI}$ starting from a slot where the UE detects the DCI format 2_0. In step 1308, the UE transmits a number of PUSCH repetitions avoiding certain symbols. The avoided symbols can be indicated as flexible for DL over $N_{SFI}$. For example, the UE transmits a number of PUSCH repetitions smaller than $N_{nominal}$ repetitions avoiding symbols indicated as flexible or DL over $N_{SFI}$ slots (of step 1306). In step 1310, the UE monitors a DCI format 2_0, wherein an SFI-index field value in a DCI format 2_0 indicates to a UE a slot format for each slot in a number of slots $N_{SFI}$ starting from a slot where the UE detects the DCI format 2_0. In step 1312, the UE transmits more PUSCH repetitions avoiding symbols indicated as flexible or DL over $N_{SFI}$ slots (of step 1310). It is noted that steps 1310 and 1312 are repeated if not all $N_{nominal}$ repetitions have been transmitted.

Although the method 1300 of FIG. 13 is shown as a series of steps, various steps could overlap, occur in parallel, occur in a different order, or occur multiple times. In another example, steps may be omitted or replaced by other steps. For example, steps of the method 1300 can be executed in a different order.

Embodiments of the present disclosure provide for frequency hopping. The following examples and embodiments describe frequency hopping. When a number of symbols $N_{PUSCH}=L \cdot N_{nominal}$ is used to determine a length of a PUSCH transmission with repetitions, as described above, a PUSCH transmission can be scheduled in symbols that have been indicated by an UL-DL TDD configuration provided by higher layers as UL symbols or flexible symbols and needs to avoid DL symbols or flexible (reserved) symbols that are indicated by a DCI format providing a slot structure. Each repetition of a number of L symbols can span more than one slot and the symbols may not be adjacent.

A UE, such as the UE 116, can be configured for frequency hopping of a PUSCH transmission with repetitions by a higher layer parameter or by the DCI format, if any, scheduling the PUSCH transmission. The UE can then apply frequency hopping between (actual) repetitions of the PUSCH transmission. The frequency hopping can apply per $N_{FH}$ repetitions where $N_{FH}$ can be predetermined in the system operation or provided by higher layers. A frequency offset between two frequency hops, with the starting hop being associated to the scheduled resource of the initial transmission can be defined. Alternatively, an intra-slot frequency hopping offset can be defined per number of PUSCH symbols. For example, the number of symbols can be predefined in the system operation, such as a number of symbols corresponding to a number of nominal repetitions or can be configured by higher layers.

The indication of which TDRA table to use can be indicated in a field in a SIB. For example, a field in a SIB that contains radio resource configuration information that is common for all UEs.

A default PUSCH time domain resource allocation A for normal CP is described in Table 3, below.

TABLE 3

| Row index | PUSCH mapping type | $K_2$ | S | L | CE level |
|---|---|---|---|---|---|
| 1 | Type A | j | 0 | 14 | 0 |
| 2 | Type A | j | 0 | 12 | 0 |
| 3 | Type A | j | 0 | 10 | 0 |
| 4 | Type B | j | 2 | 10 | 0 |
| 5 | Type B | j | 4 | 10 | 0 |
| 6 | Type B | j | 4 | 8 | 0 |
| 7 | Type B | j | 4 | 6 | 0 |
| 8 | Type A | j + 1 | 0 | 14 | 1 |
| 9 | Type A | j + 1 | 0 | 12 | 1 |
| 10 | Type A | j + 1 | 0 | 10 | 1 |
| 11 | Type A | j + 2 | 0 | 14 | 1 |
| 12 | Type A | j + 2 | 0 | 12 | 1 |
| 13 | Type A | j + 2 | 0 | 10 | 1 |
| 14 | Type B | j | 8 | 6 | 0 |
| 15 | Type A | j + 3 | 0 | 14 | 1 |
| 16 | Type A | j + 3 | 0 | 10 | 1 |

A default PUSCH time domain resource allocation A for extended CP is described in Table 4, below.

TABLE 4

| Row index | PUSCH mapping type | K₂ | S | L | CE level |
|---|---|---|---|---|---|
| 1 | Type A | j | 0 | 8 | 0 |
| 2 | Type A | j | 0 | 12 | 0 |
| 3 | Type A | j | 0 | 10 | 0 |
| 4 | Type B | j | 2 | 10 | 1 |
| 5 | Type B | j | 4 | 4 | 1 |
| 6 | Type B | j | 4 | 8 | 1 |
| 7 | Type B | j | 4 | 6 | 1 |
| 8 | Type A | j + 1 | 0 | 8 | 1 |
| 9 | Type A | j + 1 | 0 | 12 | 1 |
| 10 | Type A | j + 1 | 0 | 10 | 1 |
| 11 | Type A | j + 2 | 0 | 6 | 1 |
| 12 | Type A | j + 2 | 0 | 12 | 1 |
| 13 | Type A | j + 2 | 0 | 10 | 1 |
| 14 | Type B | j | 8 | 4 | 1 |
| 15 | Type A | j + 3 | 0 | 8 | 1 |
| 16 | Type A | j + 3 | 0 | 10 | 1 |

A default PUSCH time domain resource allocation A for extended CP is described in TABLE 5, below.

TABLE 5

| Row index | PUSCH mapping type | K₂ | S | L | CE level |
|---|---|---|---|---|---|
| 1 | Type A | j | 0 | 8 | 0 |
| 2 | Type A | j | 0 | 12 | 0 |
| 3 | Type A | j | 0 | 10 | 0 |
| 4 | Type B | j | 2 | 10 | 1 |
| 5 | Type B | j | 4 | 4 | 2 |
| 6 | Type B | j | 4 | 8 | 2 |
| 7 | Type B | j | 4 | 6 | 2 |
| 8 | Type A | j + 1 | 0 | 8 | 0 |
| 9 | Type A | j + 1 | 0 | 12 | 0 |
| 10 | Type A | j + 1 | 0 | 10 | 0 |
| 11 | Type A | j + 2 | 0 | 6 | 0 |
| 12 | Type A | j + 2 | 0 | 12 | 0 |
| 13 | Type A | j + 2 | 0 | 10 | 0 |
| 14 | Type B | j | 8 | 4 | 3 |
| 15 | Type A | j + 3 | 0 | 8 | 0 |
| 16 | Type A | j + 3 | 0 | 10 | 0 |

A default PUSCH time domain resource allocation A for normal CP for CE level 1, is described in TABLE 6, below.

TABLE 6

| Row index | PUSCH mapping type | K₂ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

A default PUSCH time domain resource allocation A for extended CP is described in TABLE 7, below.

TABLE 7

| Row index | PUSCH mapping type | K₂ | S | L | Number of slots |
|---|---|---|---|---|---|
| 1 | Type A | j | 0 | 8 | 1 |
| 2 | Type A | j | 0 | 12 | 1 |
| 3 | Type A | j | 0 | 10 | 1 |
| 4 | Type B | j | 2 | 10 | 2 |
| 5 | Type B | j | 4 | 4 | 4 |
| 6 | Type B | j | 4 | 8 | 4 |
| 7 | Type B | j | 4 | 6 | 4 |
| 8 | Type A | j + 1 | 0 | 8 | 1 |
| 9 | Type A | j + 1 | 0 | 12 | 1 |
| 10 | Type A | j + 1 | 0 | 10 | 1 |
| 11 | Type A | j + 2 | 0 | 6 | 1 |
| 12 | Type A | j + 2 | 0 | 12 | 1 |
| 13 | Type A | j + 2 | 0 | 10 | 1 |
| 14 | Type B | j | 8 | 4 | 8 |
| 15 | Type A | j + 3 | 0 | 8 | 1 |
| 16 | Type A | j + 3 | 0 | 10 | 1 |

It is noted that the TDRA tables of 16 entries above can be extended to include additional combinations of PUSCH mapping type, K2, S and L parameters.

Different TDRA tables for Msg3 PUSCH transmission can be defined to be used by a UE depending on whether the UE initiates the random access before RRC_CONNECTED state or in RRC_CONNECTED state. For example, for a UE not in a connected mode, the signaling to indicate the tables can be the same as described above. For a UE in a connected mode, the indication of which TDRA table to use can be indicated in a field in the IE PUSCH-Config which is used to configure the UE specific PUSCH parameters applicable to a particular BWP. For instance, as illustrated in Syntax (2) below, a field Msg3-PUSCH-TimeDomainAllocationTable can indicate a TDRA table, and a field Msg3-PUSCH-TimeDomainAllocation can indicate a combination of PUSCH mapping type, slot offset, start symbol and length from the TDRA table.

```
Syntax                                                (2)
-- ASN1START
-- TAG-PUSCH-CONFIGCOMMON-START
PUSCH-Config ::=    SEQUENCE {
    ...
    Msg3-PUSCH-TimeDomainAllocationTable    INTEGER (1...maxNrofUL-
AllocationTables)
        OPTIONAL, -- Need R
    Msg3-PUSCH-TimeDomainAllocation         INTEGER (1...maxNrofUL-
Allocations)
```

```
      OPTIONAL, -- Need R
   ...
   }
-- TAG-PUSCH-CONFIG-STOP
-- ASN1STOP
```

Embodiments of the present disclosure provide for reception of PDSCH after transmission of Msg3 PUSCH. The following examples and embodiments describe receiving PDSCH after transmission of Msg3 PUSCH. In response to a Msg3 PUSCH transmission scheduled by a RAR UL grant when a UE has not been provided a C-RNTI, the UE attempts to detect a DCI format. The DCI format can be a DCI format 1_0 with CRC scrambled by a corresponding TC-RNTI scheduling a PDSCH reception that includes a UE contention resolution identity (such as described in TS 38.321 v.16.0.0). There is a minimum time between the transmission of the first repetition of a Msg3 PUSCH transmission in a first valid slot, and the time when the UE attempts to detect a DCI format, such as a DCI format 1_0, with CRC scrambled by a corresponding TC-RNTI scheduling a PDSCH reception that includes a UE contention resolution identity (such as described in TS 38.321 v.16.0.0). This minimum time duration of $N_1$ symbols corresponds to a minimum number of transmitted Msg3 repetitions. This minimum number of Msg3 repetitions can be configured and can be smaller than the number of repetitions indicated to the UE. A UE can receive a PDCCH with a DCI format scheduling a PDSCH reception before the UE transmits all configured/indicated repetitions of a Msg3 PUSCH transmission.

Figure 14:
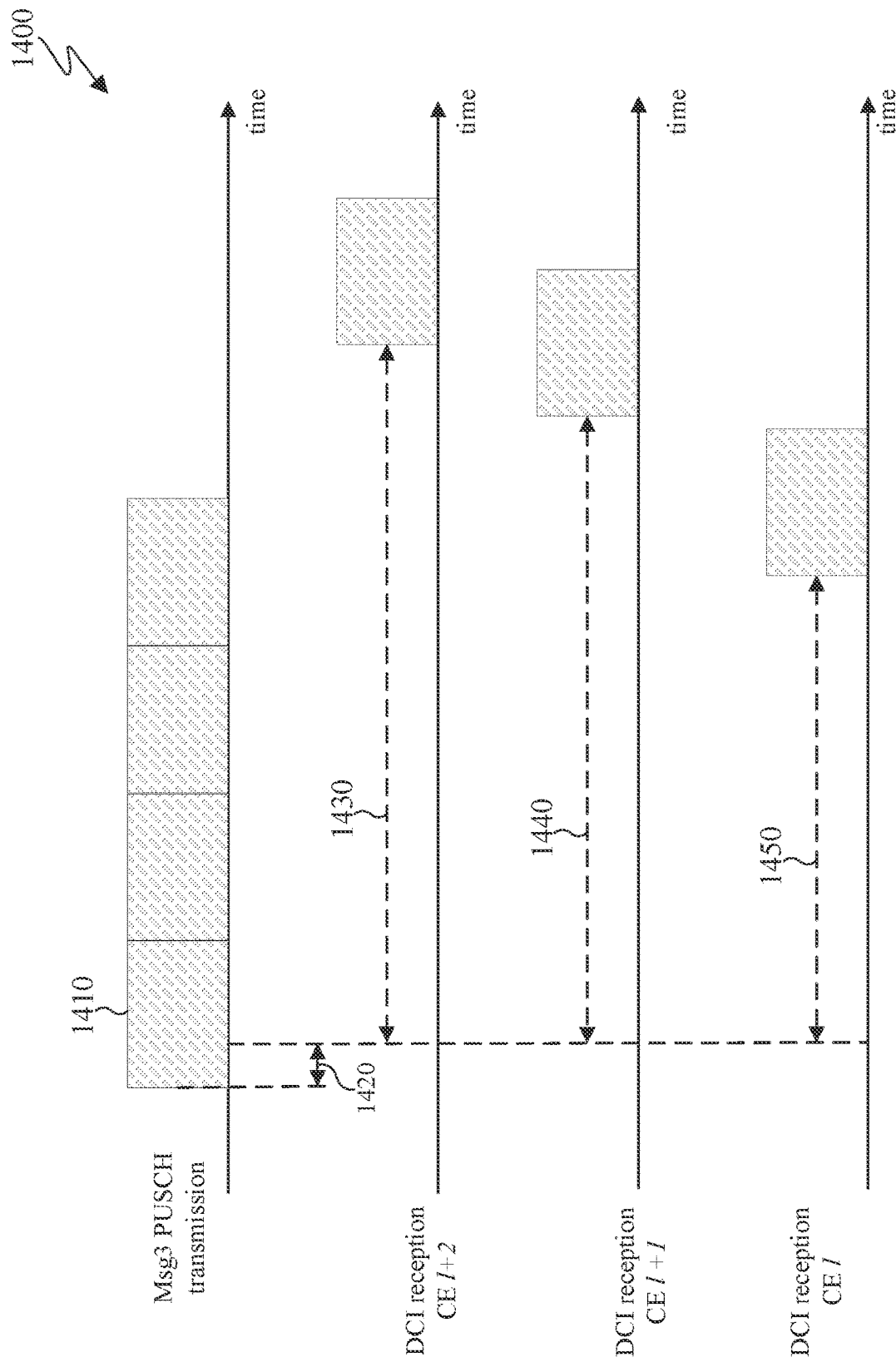
FIG. 14 illustrates an example timing diagram according to embodiments of the present disclosure.

FIG. 14 illustrates an example timing diagram 1400 according to embodiments of the present disclosure. The example timing diagram 1400 of FIG. 14 is for illustration only and other embodiments can be used without departing from the scope of the present disclosure.

Referring to FIG. 14, a UE, such as the UE 116, starts a transmission of a first repetition of Msg3 PUSCH at symbol S 1420 of a first slot 1410, and repeats the transmission over four slots. A minimum time between the transmission of the first repetition of a Msg3 PUSCH transmission in a first slot, and the time when the UE attempts to detect a DCI format scheduling a PDSCH reception, is defined. The time when the UE attempts to detect such DCI can occur after all repetitions of Msg3 PUSCH are transmitted. After the transmission of the last PUSCH symbol of the last repetition in the last slot, and after at least a number of additional symbol to allow for DL-to-UL switching time, such as 1 symbol, a UE can attempt to detect a DCI scheduling a PDSCH. This time interval can be associated with a CE level which corresponds to a number of Msg3 PUSCH repetitions 1430. A shorter time interval can be associated with a lower CE level 1440. It is also possible that a UE is capable of attempting to detect the DCI format while transmitting repetitions of Msg3 PUSCH transmission 1450 as a gNB can detect a TB prior to all scheduled repetitions of a Msg3 PUSCH transmission and can then schedule a PDSCH reception. Upon detection of a DCI format scheduling a PDSCH reception, the UE 116 suspends transmission of remaining repetitions of a Msg3 PUSCH.

Figure 15:
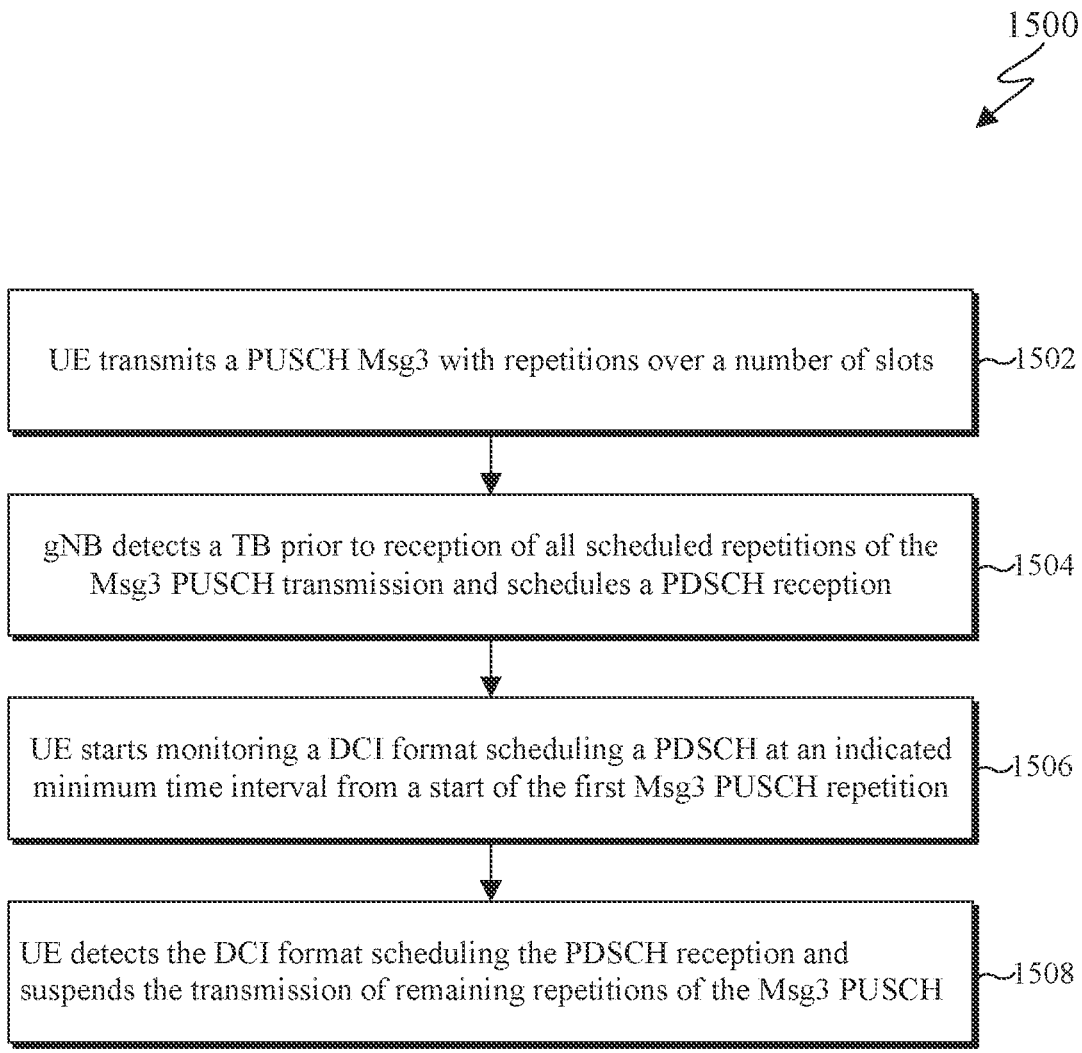
FIG. 15 illustrates an example method for monitoring a downlink control information (DCI) format scheduling a physical downlink shared channels (PDSCH) repletion according to embodiments of the present disclosure.

FIG. 15 illustrates an example method 1500 for monitoring a DCI format scheduling a PDSCH repletion according to embodiments of the present disclosure. For example, the steps of the method 1500 can be performed by any of the UEs 111-116 of FIG. 1, such as the UE 116 of FIG. 3. The method 1500 of FIG. 15 is for illustration only and other embodiments can be used without departing from the scope of the present disclosure.

As illustrated in FIG. 15, the method 1500 describes an exemplary procedure for a UE to start monitoring a DCI format scheduling a PDSCH reception. In step 1502, a UE transmits a Msg3 PUSCH with repetitions over a number of slots. In step 1504, the gNB (such as the BS 102) detects a TB prior to reception of all scheduled repetitions of the Msg3 PUSCH transmission and schedules a PDSCH. In step 1506, the UE starts monitoring a DCI format for scheduling a PDSCH at an indicated minimum time interval from a start of the first Msg3 PUSCH repetition. In step 1508, the UE detects the DCI format scheduling the PDSCH reception and suspends the transmission of remaining repetitions of the Msg3 PUSCH.

Although FIG. 15 illustrates example methods, various changes may be made to FIG. 15. For example, while the method 1500 is shown as a series of steps, various steps could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to:
      receive, from a base station (BS), common information including first information on a number of repetitions for a physical uplink shared channel (PUSCH) for a message 3 (Msg 3) via a radio resource control (RRC) signaling, wherein a plurality of candidate values of the number of repetitions for the PUSCH for the Msg 3 is configured based on the first information, and
      receive, from the BS, a random access response (RAR) message including an uplink (UL) grant that schedules the PUSCH for the Msg 3; and a processor operably coupled with the transceiver, the processor configured to:
identify the number of repetitions for the PUSCH for the Msg 3 based on a field in the UL grant of RAR message, wherein a value of the field indicates one of the plurality of candidate values, and
identify whether to repeatedly transmit the PUSCH including the Msg 3 based on a comparison between a reference signal received power (RSRP) value and a threshold,
wherein the transceiver is further configured to transmit, to the BS, the PUSCH including the Msg 3 based on the number of repetitions identified based on the value of the field, and
wherein in case that the RSRP value is less than the threshold, the PUSCH including the Msg 3 is transmitted repeatedly on a selected UL BWP.

2. The UE of claim 1, wherein:
a number of the plurality of candidate values is four, and the value of the field in the UL grant of the RAR message comprises 2 bits.

3. The UE of claim 1, wherein:
the transceiver is further configured to receive, from the BS, a time division duplex (TDD) UL-downlink (DL) configuration, and
the processor is further configured to determine multiple slots for the PUSCH transmission with the number of repetitions based on the TDD UL-DL configuration.

4. The UE of claim 1, wherein:
the transceiver is further configured to receive, from the BS, second information configuring at least one UL bandwidth part (BWP),
the processor is further configured to select the UL BWP configured for Msg 3 PUSCH repetitions among the at least one UL BWP, and
the PUSCH including the Msg 3 is transmitted on the selected UL BWP.

5. The UE of claim 1, wherein the processor is further configured to:
identify a PUSCH repetition type; and
determine multiple slots for the PUSCH transmission based on the PUSCH repetition type.

6. The UE of claim 5, wherein:
the processor is further configured to identify that a frequency hopping is configured for the PUSCH, and
the frequency hopping is applied to the PUSCH transmission on the multiple slots.

7. A base station in a wireless communication system, the base station comprising:
a transceiver configured to:
transmit, to a user equipment (UE), common information including first information on a number of repetitions for a physical uplink shared channel (PUSCH) for a message 3 (Msg 3) via a radio resource control (RRC) signaling, wherein a plurality of candidate values of the number of repetitions for the PUSCH for the Msg 3 is configured based on the first information,
transmit, to the UE, a random access response (RAR) message including an uplink (UL) grant that schedules the PUSCH for the Msg 3, wherein a value of a field in the UL grant of the RAR message indicates one of the plurality of candidate values, and
receive, from the UE, the PUSCH including the Msg 3, wherein:
the PUSCH including the Msg 3 is received based on the number of repetitions indicated based on the value of the field,
whether the PUSCH including the Msg 3 is repeatedly received is based on a comparison between a reference signal received power (RSRP) value and a threshold, and
in case that the RSRP value is less than the threshold, the PUSCH including the Msg 3 is received repeatedly on a selected UL BWP.

8. The base station of claim 7, wherein:
a number of the plurality of candidate values is four, and the value of the field in the UL grant of the RAR message comprises 2 bits.

9. The base station of claim 7, wherein:
the transceiver is further configured to transmit, to the UE, a time division duplex (TDD) UL-downlink (DL) configuration, and
the TDD UL-DL configuration indicates multiple slots for the PUSCH reception with the number of repetitions.

10. The base station of claim 7, wherein:
the transceiver is further configured to transmit, to the UE, second information configuring at least one UL bandwidth part (BWP), and
the PUSCH including the Msg 3 is received on the UL BWP configured for Msg 3 PUSCH repetitions among the at least one UL BWP.

11. The base station of claim 7, further comprising a processor operably coupled to the transceiver and configured to:
identify a PUSCH reception type; and
determine multiple slots for the PUSCH reception based on the PUSCH repetition type.

12. The base station of claim 11, wherein:
the processor is further configured to identifying that a frequency hopping is configured for the PUSCH, and
the frequency hopping is applied to the PUSCH reception on the multiple slots.

13. A method performed by a user equipment (UE) in a wireless communication system, the method comprising:
receiving, from a base station (BS), common information including first information on a number of repetitions for a physical uplink shared channel (PUSCH) for a message 3 (Msg 3) via a radio resource control (RRC) signaling, wherein a plurality of candidate values of the number of repetitions for the PUSCH for the Msg 3 is configured based on the first information;
receiving, from the BS, a random access response (RAR) message including an uplink (UL) grant that schedules the PUSCH for the Msg 3;
identifying the number of repetitions for the PUSCH for the Msg 3 based on a field in the UL grant of RAR message, wherein a value of the field indicates one of the plurality of candidate values;
identifying whether to repeatedly transmit the PUSCH including the Msg 3 based on a comparison between a reference signal received power (RSRP) value and a threshold; and
transmitting, to the BS, the PUSCH including the Msg 3 based on the number of repetitions identified based on the value of the field,
wherein in case that the RSRP value is less than the threshold, the PUSCH including the Msg 3 is repeatedly transmitted to the BS.

14. The method of claim 13, wherein:
a number of the plurality of candidate values is four, and
the value of the field in the UL grant of the RAR message comprises 2 bits.

15. The method of claim 13, further comprising:
receiving, from the BS, a time division duplex (TDD) UL-downlink (DL) configuration; and
determining multiple slots for the PUSCH transmission with the number of repetitions based on the TDD UL-DL configuration.

16. The method of claim 13, further comprising:
receiving, from the BS, second information configuring at least one UL bandwidth part (BWP); and
selecting the UL BWP configured for Msg 3 PUSCH repetitions among the at least one UL BWP,
wherein the PUSCH including the Msg 3 is transmitted on the selected UL BWP.

17. The method of claim 13, further comprising:
identifying a PUSCH repetition type;
determining multiple slots for the PUSCH transmission based on the PUSCH repetition type; and
identifying that a frequency hopping is configured for the PUSCH,
wherein the frequency hopping is applied to the PUSCH transmission on the multiple slots.

* * * * *